United States Patent
Sugawara

(10) Patent No.: US 12,212,724 B2
(45) Date of Patent: Jan. 28, 2025

(54) INFORMATION PROCESSING SYSTEM THAT EXECUTES COMMAND CORRESPONDING TO UTTERANCE, IMAGE PROCESSING APPARATUS, CONTROL METHOD FOR INFORMATION PROCESSING SYSTEM, AND STORAGE MEDIUM STORING CONTROL PROGRAM FOR INFORMATION PROCESSING SYSTEM

(71) Applicant: CANON KABUSHIKI KAISHA, Tokyo (JP)

(72) Inventor: Kazuhiro Sugawara, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 137 days.

(21) Appl. No.: 17/541,611

(22) Filed: Dec. 3, 2021

(65) Prior Publication Data
US 2022/0201136 A1 Jun. 23, 2022

(30) Foreign Application Priority Data
Dec. 17, 2020 (JP) .................. 2020-209345

(51) Int. Cl.
*H04N 1/04* (2006.01)
*G06F 3/16* (2006.01)

(52) U.S. Cl.
CPC ............... *H04N 1/04* (2013.01); *G06F 3/167* (2013.01)

(58) Field of Classification Search
None
See application file for complete search history.

(56) References Cited

U.S. PATENT DOCUMENTS

| | | | |
|---|---|---|---|
| 8,275,617 B1* | 9/2012 | Morgan | G10L 15/22 704/251 |
| 2008/0079981 A1* | 4/2008 | Corona | G03G 15/5016 358/1.14 |
| 2010/0153111 A1 | 6/2010 | Hirai et al. | |
| 2013/0033649 A1* | 2/2013 | Kim | H04N 21/44218 348/E5.122 |

(Continued)

FOREIGN PATENT DOCUMENTS

| | | |
|---|---|---|
| JP | 2000215022 A | 8/2000 |
| JP | 2006221583 A | 8/2006 |

(Continued)

*Primary Examiner* — Kavita Stanley
*Assistant Examiner* — David V Luu
(74) *Attorney, Agent, or Firm* — ROSSI, KIMMS & McDOWELL LLP

(57) ABSTRACT

An information processing system that a user easily masters a relation between an execution process and an utterance instruction. The information processing system includes a display device, a microphone, an output unit, a display control unit, and an execution unit. The display device can display information. The microphone can obtain voice. The output unit outputs word information based on voice in natural language obtained with the microphone. The display control unit additionally displays utterance examples in association with touch objects included in a screen that is currently displayed on the display device. The execution unit executes a predetermined process linked to a touch object based on words included in a corresponding utterance example and the output word information at least.

27 Claims, 22 Drawing Sheets

(56) References Cited

U.S. PATENT DOCUMENTS

| | | | |
|---|---|---|---|
| 2013/0035942 A1* | 2/2013 | Kim | G06F 3/167 |
| | | | 704/E21.001 |
| 2013/0179173 A1* | 7/2013 | Lee | G06F 3/0487 |
| | | | 704/275 |
| 2018/0285069 A1* | 10/2018 | Matsuo | G10L 15/26 |
| 2019/0214009 A1* | 7/2019 | An | H04L 12/282 |
| 2020/0090658 A1* | 3/2020 | Shin | G10L 15/22 |
| 2020/0285423 A1* | 9/2020 | Annamalai Thangaraj | |
| | | | G06F 3/1258 |
| 2021/0166698 A1 | 6/2021 | Saito | |
| 2021/0182008 A1* | 6/2021 | Kim | H05K 5/0217 |
| 2022/0319511 A1* | 10/2022 | Lee | G10L 15/1822 |

FOREIGN PATENT DOCUMENTS

| | | |
|---|---|---|
| JP | 2013143151 A | 7/2013 |
| JP | 2019096978 A | 6/2019 |
| JP | 2020112932 A | 7/2020 |
| JP | 2020112933 A | 7/2020 |
| WO | 2007069573 A1 | 6/2007 |
| WO | 2020031781 A1 | 2/2020 |

\* cited by examiner

FIG. 8B

| Screen information | UI widget information | Voice recognition message | Operation instruction | Filter word |
|---|---|---|---|---|
| Home Screen 201 | Copy 202 | Start Copy | Start Copy | Copy |
| Home Screen 201 | Scan 203 | Start Scan | Start Scan | Scan |
| Home Screen 201 | Menu 204 | Display Menu | Display Menu | Menu |
| Home Screen 201 | Address Book 205 | Open Address Book | Display Address Book | Address, Destination |
| Home Screen 201 | Secure Print 206 | - | None | - |
| Home Screen 201 | Voice Recognition 207 | Start Voice Operation | Start Voice Operation | Voice |
| Home Screen 201 | Status Check 208 | Check Job | Status Check | Status |
| Home Screen 201 | Tab 1 | Home Screen 201 | - | |
| Home Screen 201 | Tab 2 | Home Screen 201a | Home Screen 201a | |
| Home Screen 201 | Tab 3 | Home Screen 201b | Home Screen 201b | |
| Home Screen 201 | Tab 4 | Home Screen 201c | Home Screen 201c | |
| Home Screen 201 | Tab 5 | Home Screen 201d | Home Screen 201d | |
| Home Screen 201 | Tab 6 | Home Screen 201e | Home Screen 201e | |
| Home Screen 201 | Tab 7 | Home Screen 201f | Home Screen 201f | |
| Home Screen 201 | Status 210 | Erase Words | Erase Words | |
| Home Screen 201 | Status | Display Words | Display Words | |
| Home Screen 201a | ID Card Copy | Start ID Card Copy | ID Card Copy | Copy, ID Card |
| Home Screen 201a | Passport Copy | Start Passport Copy | Passport Copy | Copy, Passport |
| Home Screen 201a | Show-through Prevention Copy | Start Show-through Prevention Copy | Show-through Prevention Copy | Copy |
| Home Screen 201a | Toner Save Copy | Start Toner Save Copy | Toner Save Copy | Copy |
| Home Screen 201a | Preset ID Card Copy | Start Preset ID Card Copy | Preset ID Card Copy | Copy, ID Card |
| Home Screen 201a | Thickening Character Copy | Start Thickening Character Copy | Thickening Character Copy | Copy, Thickening Character |
| Home Screen 201a | ... | ... | ... | ... |
| Home Screen 201b | Often Use Setting A | Display Often Use Setting A | Often Use Setting A | Scan, Destination X |
| Home Screen 201b | Often Use Setting B | Display Often Use Setting B | Often Use Setting B | Scan, Destination Y |
| Home Screen 201b | Send with Fixed Phrase | Send Mail with Fixed Phrase | Send with Fixed Phrase | Scan, Mail, Greetings |
| Home Screen 201b | Fixed Destination Scan | Send to Fixed Destination | Fixed Destination Scan | Scan, Destination Z |
| Home Screen 201b | Sorting Scan | Send while Sorting | Sorting Scan | Scan, File |
| Copy Screen | ... | ... | ... | ... |
| ... | | | | |

INFORMATION PROCESSING SYSTEM THAT EXECUTES COMMAND CORRESPONDING TO UTTERANCE, IMAGE PROCESSING APPARATUS, CONTROL METHOD FOR INFORMATION PROCESSING SYSTEM, AND STORAGE MEDIUM STORING CONTROL PROGRAM FOR INFORMATION PROCESSING SYSTEM

BACKGROUND OF THE INVENTION

Field of the Invention

The present invention relates to an information processing system, an image processing apparatus, a control method for the information processing system, and a storage medium storing a control program for the information processing system.

Description of the Related Art

Information processing systems that analyze user's utterances and execute commands corresponding to the utterances are becoming pervasive these days. Japanese Laid-Open Patent Publication (Kokai) No. 2020-112933 (JP 2020-112933A) suggests a related technique. In this publication, identifiers, such as numerical characters and alphabets, are added to UI widgets displayed on an operation screen of an information processing apparatus, and processes corresponding to the UI widgets are achieved by receiving utterance instructions using the identifiers.

However, since the identifiers, such as numerical characters and alphabets, have not a semantic relation to the executed processes, a user is difficult to master. Accordingly, an information processing system that easily familiarizes a user with the relation between an execution process and an utterance instruction is desired.

SUMMARY OF THE INVENTION

The present invention provides an information processing system that a user easily masters the relation between an execution process and an utterance instruction, an image processing apparatus, a control method and a control program for the information processing system.

Accordingly, an aspect of the present invention provides an information processing system including a display device that can display information, a microphone that can obtain voice, an output unit configured to output word information based on voice in natural language obtained with the microphone, a display control unit configured to additionally display utterance examples in association with touch objects included in a screen that is currently displayed on the display device, and an execution unit configured to execute a predetermined process linked to a specified touch object based on words included in a corresponding utterance example and the output word information at least.

According to the present invention, a user can easily master a relation between an execution process and an utterance instruction.

Further features of the present invention will become apparent from the following description of exemplary embodiments with reference to the attached drawings.

BRIEF DESCRIPTION OF THE DRAWINGS

FIG. 8B is a view describing information that a data management module in FIG. 8A manages.

DESCRIPTION OF THE EMBODIMENTS

Figure 1:
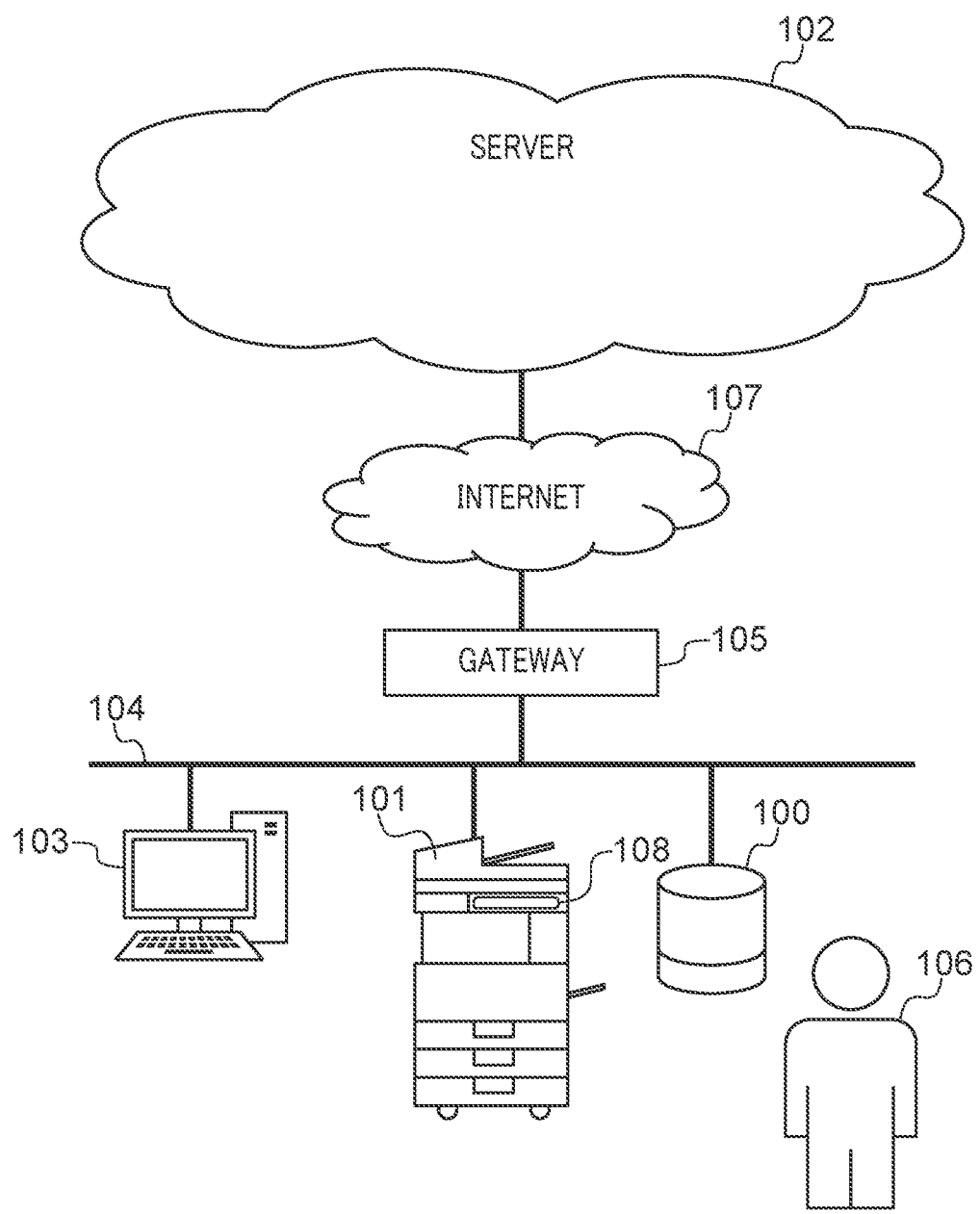
FIG. 1 is a block diagram showing an information processing system according to an embodiment.

Hereafter, embodiments according to the present invention will be described in detail by referring to the drawings. However, components mentioned in the embodiment are mere examples, and these do not restrict the scope of the present invention.

FIG. 1 is a block diagram showing an information processing system according to the embodiment. As shown in FIG. 1, the information processing system consists of a voice control apparatus 100, an image forming apparatus (an image processing apparatus) 101, a server (an information processing apparatus) 102, a client terminal 103, and a gateway 105. It should be noted that the information processing system may be provided with a plurality of voice control apparatuses 100, image forming apparatuses 101, and client terminals 103, respectively.

The voice control apparatus 100, image forming apparatus 101, and client terminal 103 are mutually communicable through the gateway 105 and a network 104. Moreover, the voice control apparatus 100, image forming apparatus 101, and client terminal 103 are communicable with the server 102 through the gateway 105 and the Internet 107.

In response to a voice operation start instruction from the user 106, the voice control apparatus 100 obtains voice of a user 106, codes the obtained voice (voice information of natural language), and transmits the coded voice data to the server 102. Moreover, the voice control apparatus 100 outputs voice data received from the server 102 as voice. The voice control apparatus 100 is a voice input/output apparatus, such as a smart speaker or a smart phone, that enables voice communication with a user. In the embodiment, the voice control apparatus 100 and the image forming apparatus 101 are independent. However, the embodiment is not limited to this configuration. For example, hardware functions (hardware blocks mentioned later by referring to FIG. 3) and software functions (software blocks mentioned later by referring to FIG. 6) that constitute the voice control apparatus 100 may be included in the image forming apparatus 101.

Figure 2:
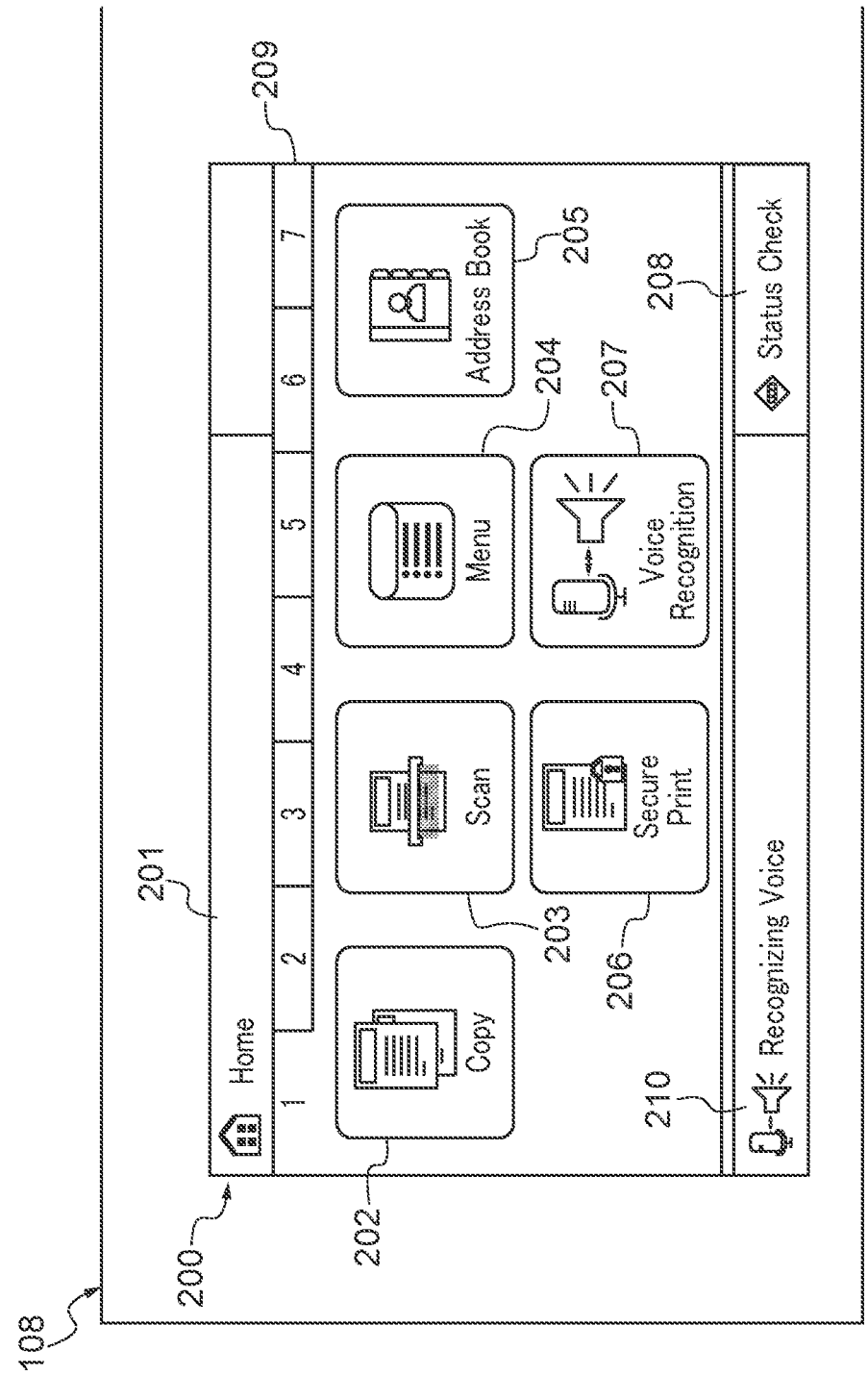
FIG. 2 is a view showing an example of a home screen displayed on a touch panel of an operation panel of an image forming apparatus included in the information processing system in FIG. 1.

The image forming apparatus 101 is a multifunction apparatus equipped with a plurality of functions, such as a copy function, scan function, print function, and facsimile function, in this embodiment. However, the image forming apparatus 101 may be a printer or a scanner equipped with a single function. The following description presumes that the image forming apparatus 101 is a color laser beam multifunction apparatus. Moreover, the image forming apparatus 101 is provided with an operation panel 108. The operation panel 108 is a display unit that displays a screen through which an operation instruction is received from the user 106 and that displays a state of the image forming apparatus 101. Moreover, the operation panel 108 is provided with a touch panel (a display device) 200 that is united with an LCD display as shown in FIG. 2 mentioned later and functions also as an input unit that receives an operation of the user 106.

The server 102 performs voice recognition of voice data of the user 106 obtained from the voice control apparatus 100 and determines words related to a setting operation of the image forming apparatus 101 or execution of a job on the basis of the result of the voice recognition. It should be noted that a job shows a unit of a series of image forming processes (for example, a copy process, scan process, print process, etc.) that the image forming apparatus 101 achieves using a print engine 513 and a scanner 515 in FIG. 5 mentioned later. Moreover, the server 102 generates a text depending on the result of the voice recognition or the above-mentioned word determination result and combines voice data that the voice control apparatus 100 reproduces contents of the text as voice. It should be noted that the server 102 can provide a high-precision voice recognition result by using machine learning, such as deep learning, with a neural network. For example, the server 102 learns so as to recognize a voice from a distant user correctly. Moreover, the server 102 is compatible with a natural language process and can obtain suitable information (a word, a kana-kanji conversion result in a case of Japanese) from input natural language by passing through a morphological analysis, syntax analysis, semantic analysis, context analysis, etc.

The client terminal 103 is a personal computer (PC) that the user 106 uses, for example. The client terminal 103 generates a print job for controlling the image forming apparatus 101 to print an electronic file. The electronic file is stored in an external storage unit 505 in FIG. 5 mentioned later, the client terminal 103, or the like. Moreover, the client terminal 103 receives the image data that the image forming apparatus 101 scans and generates from the image forming apparatus 101.

The network 104 mutually connects the voice control apparatus 100, the image forming apparatus 101, the client terminal 103, and the gateway 105. Various data, such as a print job and a scan job, and voice data are transmitted and received through the network 104.

The gateway 105 is a wireless LAN router based on an IEEE802.11 standard series, etc., for example. The IEEE802.11 standard series includes a series of standards belonging to the IEEE802.11, such as IEEE802.11a and IEEE802.11b. It should be noted that the gateway 105 may have ability to operate according to other wireless communication systems different from the IEEE802.11 standard series. Moreover, the gateway 105 may not be a wireless LAN router, but may be a wired LAN router based on the Ethernet standard represented by 10BASE-T, 100BASE-T, 1000BASE-T, etc. and may have ability to operate according to another wired communication system.

FIG. 2 is a view showing an example of a home screen 201 displayed on the touch panel 200 of the operation panel 108 shown in FIG. 1. The home screen 201 is displayed when the image forming apparatus 101 starts. UI widgets (touch objects) of functions that the image forming apparatus 101 executes are displayed on the home screen 201. In the description, a UI widget means a certain area (a button, an icon, a mark, an arrow, a tab, and a rectangle) that the user 106 can distinguish on the touch panel 200. When the user 106 touches a UI widget, a function associated with the touched UI widget is executed.

Figure 11A:
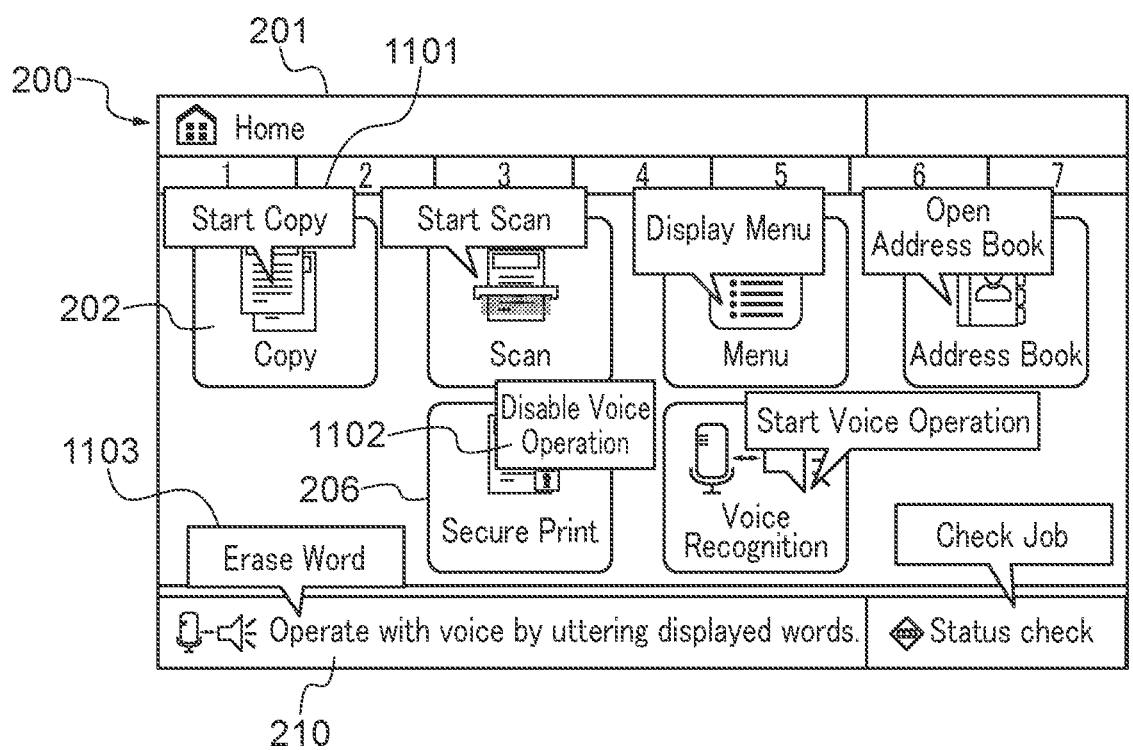
FIG. 11A, FIG. 11B, FIG. 11C, and FIG. 11D are views showing examples of screens displayed on the touch panel in FIG. 2.
Figure 11B:
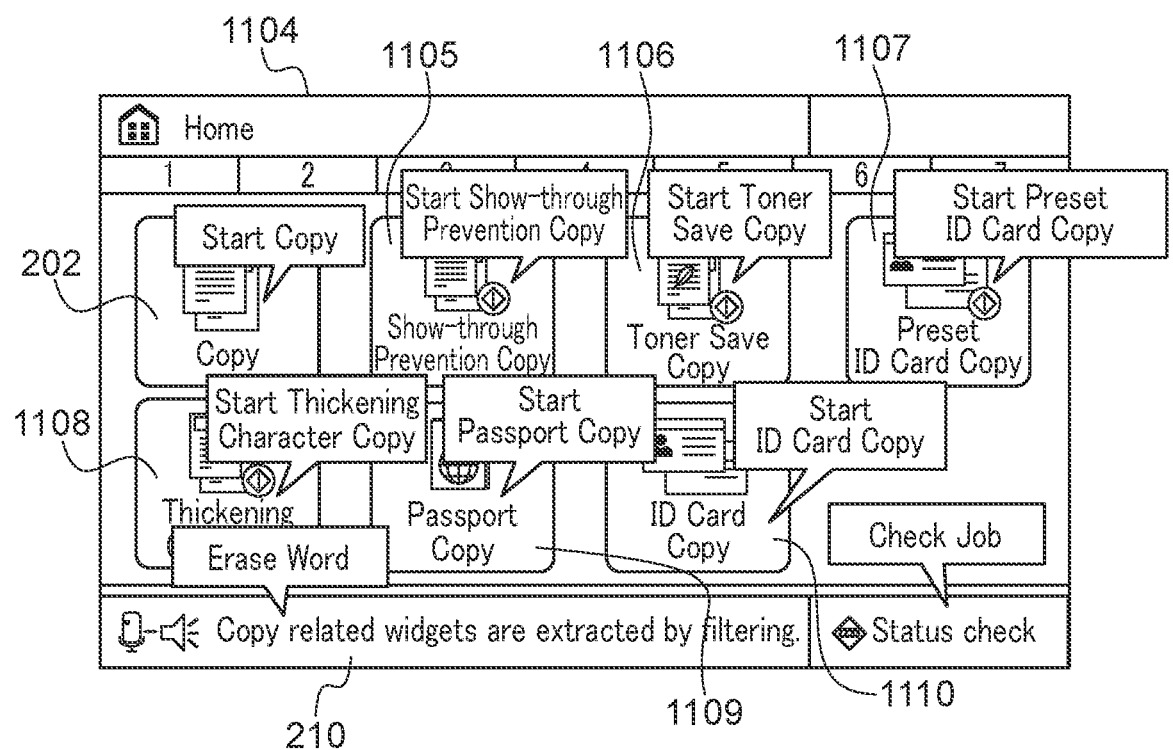
Figure 11C:
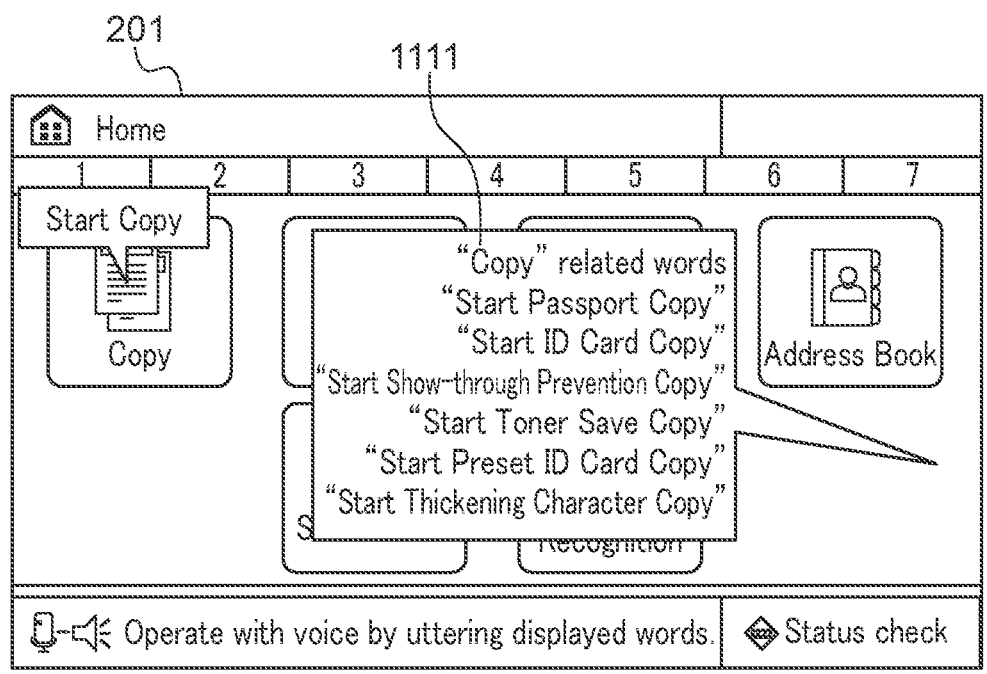
Figure 11D:
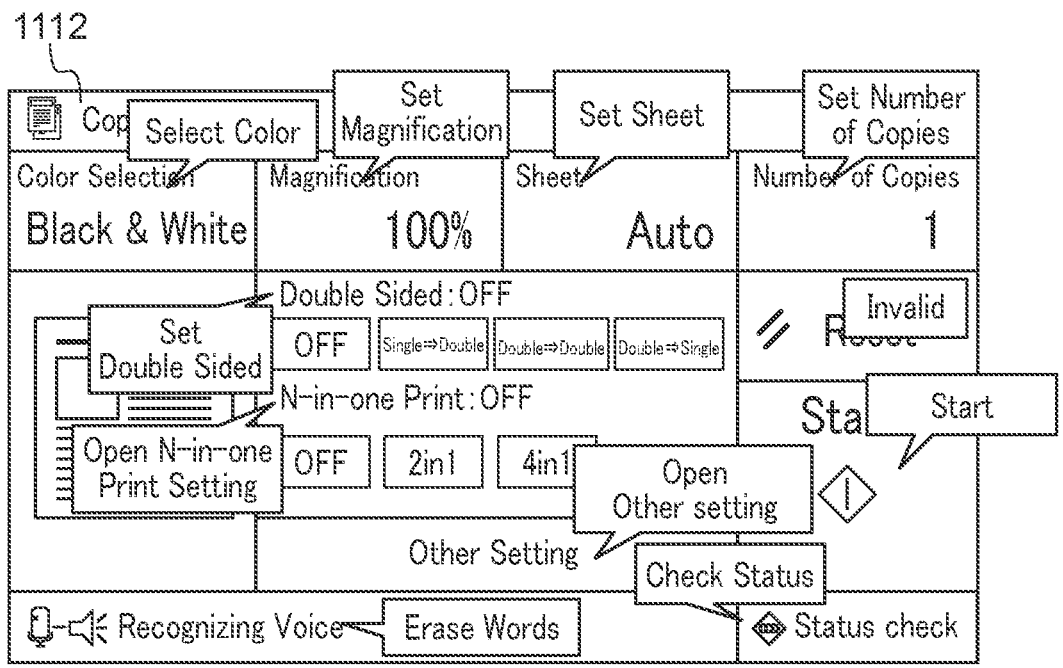

A copy button 202 is a UI widget that causes screen transition to a copy screen 1112 shown in FIG. 11D mentioned later on which setting required for execution of a copy function is performed. A scan button 203 is a UI widget that causes screen transition to a scan screen (not shown) on which setting required for execution of a scan function is performed. A menu button 204 is a UI widget that causes screen transition to a menu screen (not shown) on which a display language of the operation panel 108 is set. An address book button 205 is a UI widget that causes screen transition to an address book screen on which a transmission destination of image data that the image forming apparatus 101 scans and generates is set. A secure print button 206 is a UI widget that causes screen transition to a print screen (not shown) for printing image data equipped with a password that the image forming apparatus 101 receives. A voice recognition button 207 is a UI widget for enabling a voice operation by the voice control apparatus 100. When the voice recognition button 207 is pressed and the voice operation by the voice control apparatus 100 becomes available, a message "Recognizing Voice" is displayed in a status display area 210.

A state check button 208 is a UI widget for displaying information about a job that the image forming apparatus 101 executed and an active job. Tab numbers "1" through "7" are displayed in a tab region 209. The home screen 201 consists of a plurality of page screens. When one of the tab numbers "2" through "7" is pressed, the screen is switched to a page screen corresponding to the pressed tab number. UI widgets different from the UI widgets shown in FIG. 2 are displayed on these page screens. Such a configuration enables a user to easily display the other UI widgets that are not displayed on the home screen 201 by easy press operation of a tab number. As mentioned above, the message "Recognizing Voice", which shows that voice operation is available, is displayed in the status display area 210. Moreover, job states, such as "Printing", "Receiving", "Transmitting", and "Reading", and errors, such as "Out of Sheet", "Jam", and "Out of Toner", can be displayed in the status display area 210.

Figure 3:
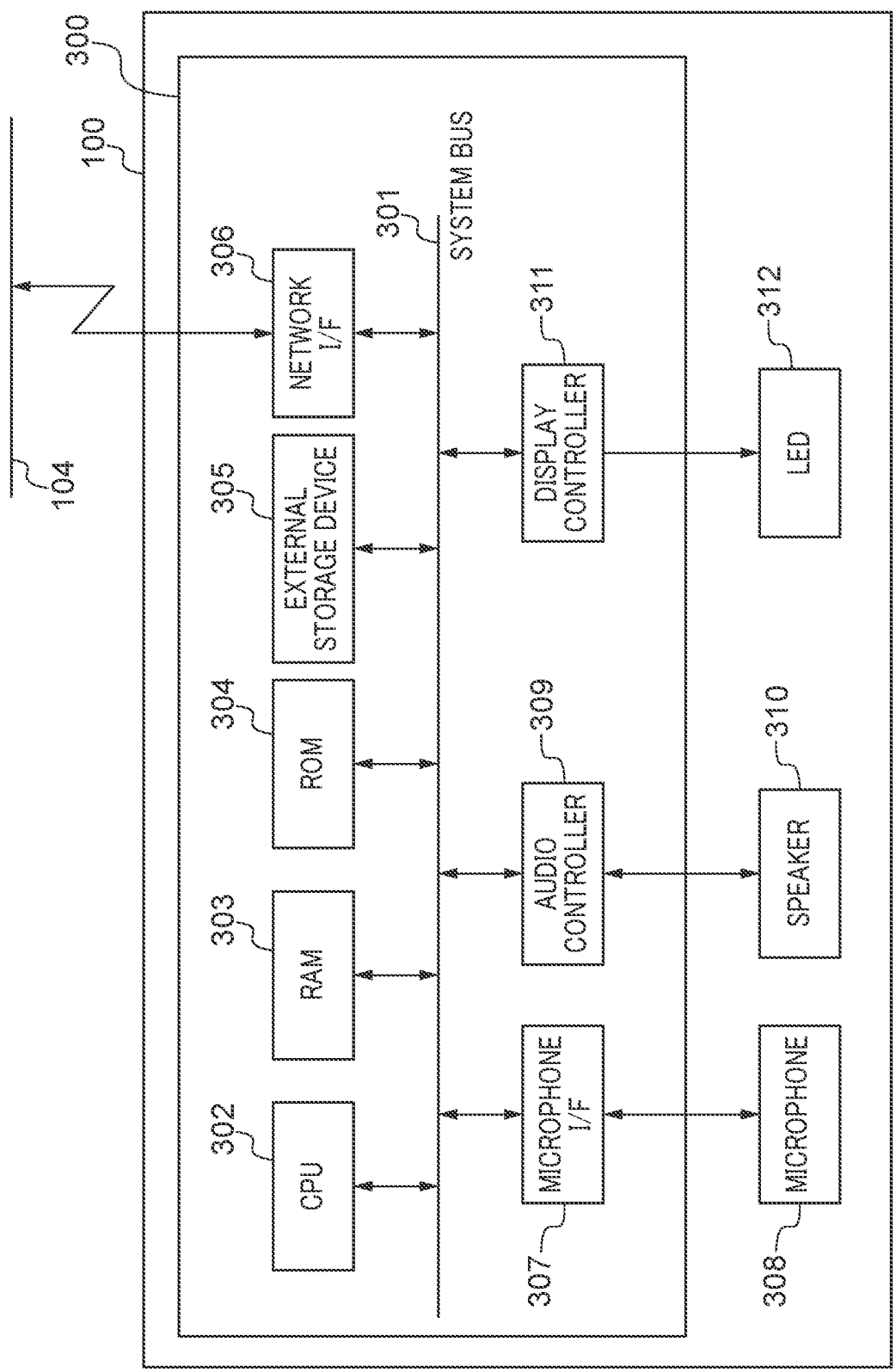
FIG. 3 is a block diagram schematically showing a hardware configuration of a voice control apparatus included in the information processing system in FIG. 1.

FIG. 3 is a block diagram schematically showing a hardware configuration of the voice control apparatus 100 in FIG. 1. As shown in FIG. 3, the voice control apparatus 100 is provided with a controller unit 300, a microphone 308, a speaker (voice output device) 310, and an LED 312. The controller unit 300 is connected with the microphone 308, speaker 310, and LED 312. Moreover, the controller unit 300 is provided with a CPU 302, a RAM 303, a ROM 304, an external storage unit 305, a network I/F (interface) 306, a microphone I/F 307, an audio controller 309, and a display controller 311. The CPU 302, RAM 303, ROM 304, external storage unit 305, network I/F 306, microphone I/F 307, audio controller 309, and display controller 311 are mutually connected through a system bus 301.

The CPU 302 is a central processing unit that controls entire operations of the controller unit 103. The RAM 303 is a volatile memory. The ROM 304 is a nonvolatile memory and stores a boot program of the CPU 302. The external storage unit 305 is a large capacity storage device (for example, an SD card) in comparison with the RAM 303. It should be noted that the external storage unit 305 may be a storage device like a flash ROM other than an SD card as long as the storage device has a function equivalent to an SD card. The external storage unit 305 stores a control program for the voice control apparatus 100 executed by the controller unit 300. For example, a voice control program 601 in FIG. 6 mentioned later is stored.

The CPU 302 runs the boot program stored in the ROM 304 when activating by turning a power source ON. The boot program is used to read a control program stored in the external storage unit 305 and to develop the control program onto the RAM 303. When running the boot program, the CPU 302 continuously runs the control program developed onto the RAM 303 and controls voice input/output, display, and a data communication with the network 104. Moreover, the CPU 302 stores data used during execution of the control program on the RAM 303 and reads and writes the data. The external storage unit 305 can store various setting values required for execution of the control program. The various setting values include a URL of the server 102 that enables access to the image forming apparatus 101, for example and are read and written by the CPU 302. The CPU 302 communicates with another apparatus on the network 104 through the network I/F 306.

The network I/F 306 includes a circuit and an antenna for communication according to the wireless communication system based on the IEEE802.11 standard series. It should be noted that the communication system of the network I/F 306 is not limited to the wireless communication system. For example, the wired communication system based on the Ethernet standard may be employed. The microphone 308 is connected to the microphone I/F 307. The microphone I/F 307 obtains voice that the user 106 utters through the microphone 308, codes the obtained voice to convert it into voice data, and stores the voice data concerned in the RAM 303 in accordance with an instruction from the CPU 302.

The microphone 308 is a voice operation device that can obtain voice of the user 106. For example, a compact MEMS microphone mounted in a smart phone etc. is employed. Moreover, it is preferable to arrange three or more microphones 308 in order to calculate an arrival direction of the voice that the user 106 utters. It should be noted that this embodiment is achievable by the single microphone 308 and the number of the microphones is not limited to three or more. The speaker 310 is connected to the audio controller 309. The audio controller 309 converts voice data into an analog voice signal in accordance with an instruction from the CPU 302 and outputs voice through the speaker 310.

The speaker 310 is a general-purpose device for reproducing voice. The speaker 310 reproduces response voice showing that the voice control apparatus 100 is responding and voice combined by the server 102.

The LED 312 is connected to the display controller 311. The display controller 311 controls lighting of LED 312 in accordance with an instruction from the CPU 302. For example, the display controller 311 controls the lighting of the LED 312 for showing that the voice control apparatus 100 is obtaining voice of the user 106 correctly. For example, the LED 312 is a blue LED that is visible to the user 106. The LED 312 is a general-purpose device. It should be noted that the LED 312 can be replaced with a display device that can display a character and a picture.

Figure 4:
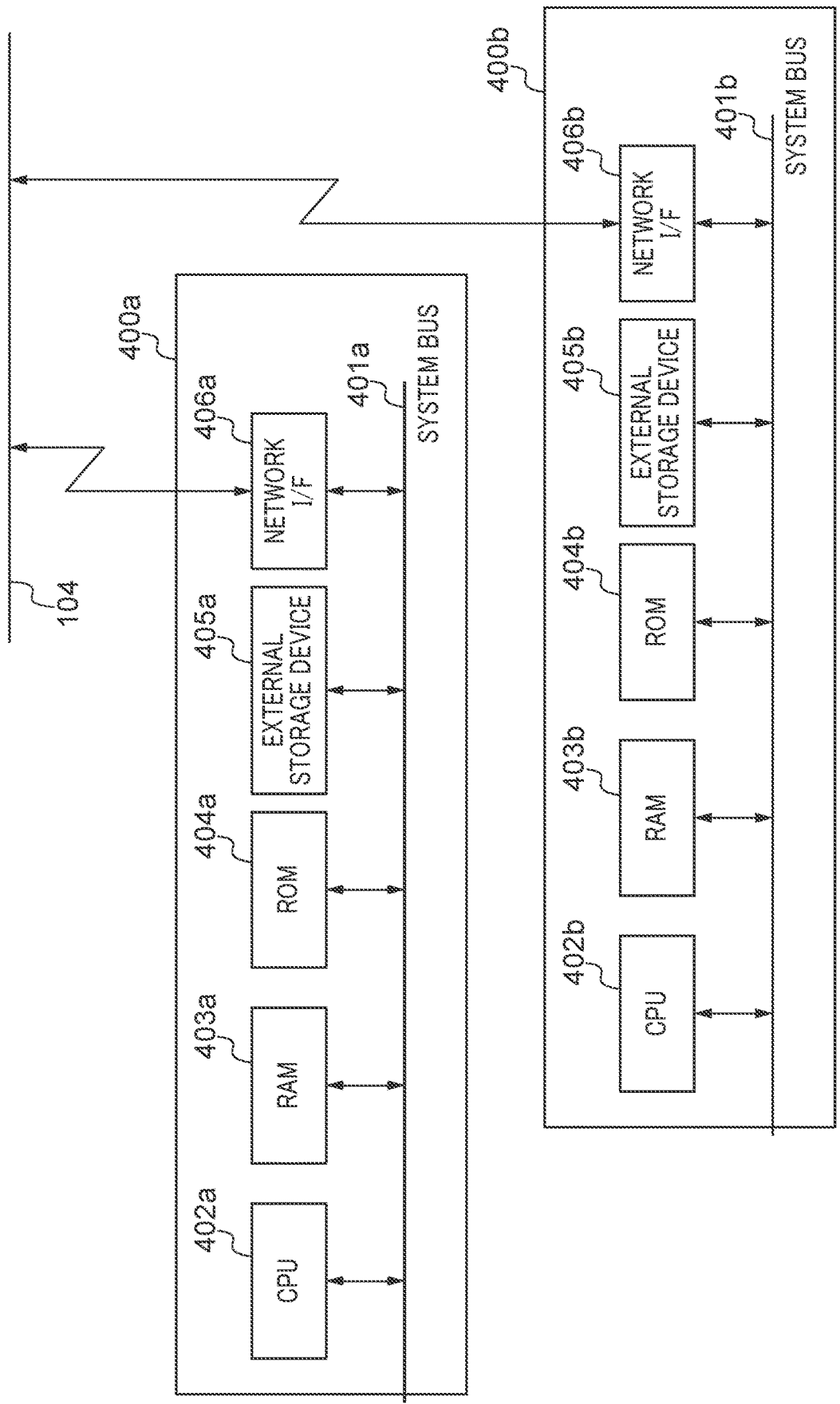
FIG. 4 is a block diagram schematically showing a hardware configuration of a controller unit of a server included in the information processing system in FIG. 1.

FIG. 4 is a block diagram schematically showing a hardware configuration of the server 102 in FIG. 1. As shown in FIG. 4, the server 102 is provided with controller units 400a and 400b. It should be noted that the controller units 400a and 400b have the same configuration in the embodiment. Hereinafter, the configuration of the controller unit 400a will be described as an example. The controller unit 400a runs a voice recognition program 701 in FIG. 7 mentioned later. The controller unit 400a is provided with a CPU 402a connected to a system bus 401a, a RAM 403a, a ROM 404a, an external storage unit 405a, and a network I/F 406a.

The CPU 402a is a central processing unit that controls entire operations of the controller unit 400a. The RAM 403a is a volatile memory. The ROM 404a is a nonvolatile memory and stores a boot program of the CPU 402a. The external storage unit 405a is a large capacity storage unit (for example, a hard disk drive: HDD) in comparison with the RAM 403a. The external storage unit 405a stores a control program for the server 102 executed by the controller unit 400a. For example, the voice recognition program 701 in FIG. 7 mentioned later is stored. It should be noted that the external storage unit 405a may be a storage device like a solid state drive (SSD) other than a hard disk drive as long as the storage device has a function equivalent to a hard disk drive. Moreover, the external storage unit 405a may be an external storage device that the server 102 can access.

The CPU 402a runs the boot program stored in the ROM 404a when activating by turning a power source ON. The boot program is used to read a control program stored in the external storage unit 405a and to develop the control program onto the RAM 403a. When running the boot program, the CPU 402a continuously runs the control program developed onto the RAM 403a and controls. Moreover, the CPU 402a stores data used during execution of the control program on the RAM 403a and reads and writes the data. The external storage unit 405a can store various setting values required for execution of the control program. The various setting values are read and written by the CPU 402a. The CPU 402a communicates with another apparatus on the network 104 through the network I/F 406a.

The controller unit 400b runs a remote control program 801 in FIG. 8 mentioned later. The controller unit 400b is provided with a CPU 402b connected to the system bus 401b, a RAM 403b, a ROM 404b, an external storage unit 405b, and a network I/F 406b. The CPU 402b, RAM 403b, ROM 404b, external storage unit 405b, and network I/F 406b respectively have the same functions and configurations with the CPU 402a, RAM 403a, ROM 404a, external storage unit 405a, and network I/F 406a. The external storage unit 405b stores a control program for the server 102 executed by the controller unit 400b. For example, the remote control program 801 in FIG. 8 mentioned later is stored. Although the configuration in which the different controller units respectively execute the voice recognition program 701 and the remote control program 801 that are mentioned later is described in the embodiment, the present invention is not limited to this configuration. For example, one of the controller units 400a and 400b may run both of the voice recognition program 701 and the remote control program 801 that are mentioned later.

Figure 5:
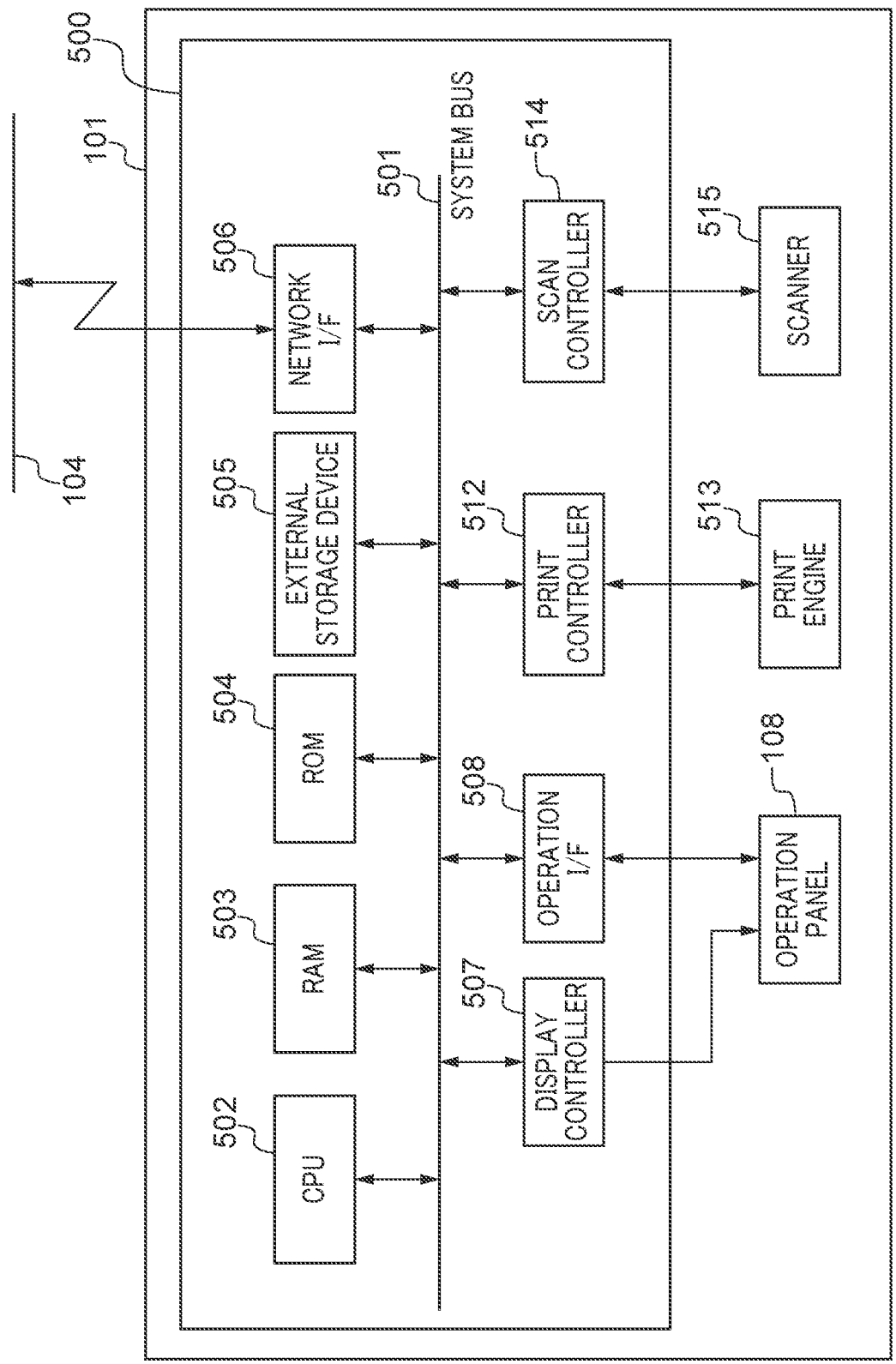
FIG. 5 is a block diagram schematically showing a hardware configuration of the image forming apparatus in FIG. 1.

FIG. 5 is a block diagram schematically showing a hardware configuration of the image forming apparatus 101 in FIG. 1. As shown in FIG. 5, the image forming apparatus 101 is provided with a controller unit 500, the operation panel 108, the print engine (printing device) 513, and the scanner (scanning device) 515. The controller unit 500 is connected with the operation panel 108, the print engine 513, and the scanner 515. Moreover, the controller unit 500 is provided with a CPU 502, a RAM 503, a ROM 504, an external storage unit 505, a network I/F 506, a display controller 507, an operation I/F 508, a print controller 512, and a scan controller 514. The CPU 502, RAM 503, ROM 504, external storage unit 505, network I/F 506, display controller 507, operation I/F 508, print controller 512, and scan controller 514 are mutually connected through a system bus 501.

The CPU 502 is a central processing unit that controls entire operations of the controller unit 500. The RAM 503 is a volatile memory. The ROM 504 is a nonvolatile memory and stores a boot program of the CPU 502. The external storage unit 505 is a large capacity storage unit (for example, a hard disk drive: HDD) in comparison with the RAM 503. The external storage unit 505 stores a control program for the image forming apparatus 101 executed by the controller unit 500. For example, a device control program 901 in FIG. 9 mentioned later is stored. It should be noted that the external storage unit 505 may be a storage device like a solid state drive (SSD) other than a hard disk drive as long as the storage device has a function equivalent to a hard disk drive.

The CPU 502 runs the boot program stored in the ROM 404a when activating by turning a power source ON. The boot program is used to read a control program stored in the external storage unit 505 and to develop the control program onto the RAM 503. When running the boot program, the CPU 502 continuously runs the control program developed onto the RAM 503 and controls. Moreover, the CPU 502 stores data used during execution of the control program on the RAM 503 and reads and writes the data. The external storage unit 505 can further store various setting values required for execution of the control program and image data read by the scanner 515. The CPU 502 reads and writes the setting values and the image data. The CPU 502 communicates with another apparatus on the network 104 through the network I/F 506 and the server 102 on the Internet through the gateway 105.

The operation panel 108 is connected to the display controller 507 and the operation I/F 508. The display controller 507 controls screen display of the touch panel 200 of the operation panel 108 in accordance with an instruction from the CPU 502. The operation I/F 508 outputs and inputs an operation signal. When the touch panel 200 is pressed, the CPU 502 obtains a coordinate that shows the pressed position on the touch panel 200 through the operation I/F 508.

The print engine 513 is connected to the print controller 512. The print controller 512 transmits control commands and image data to the print engine 513 in accordance with the instructions from the CPU 502. The print engine 513 performs the print process that prints the received image data on sheets in accordance with a control command received from the print controller 512. The scanner 515 is connected to the scanner controller 514. The scan controller 514 transmits a control command to the scanner 515 in accordance with the instruction from the CPU 502 and writes the image data received from the scanner 515 into the RAM 503. The scanner 515 performs a reading process that reads a document on a platen glass (not shown) of the image forming apparatus 101 with an optical unit in accordance with a control command received from the scan controller 514.

Figure 6:
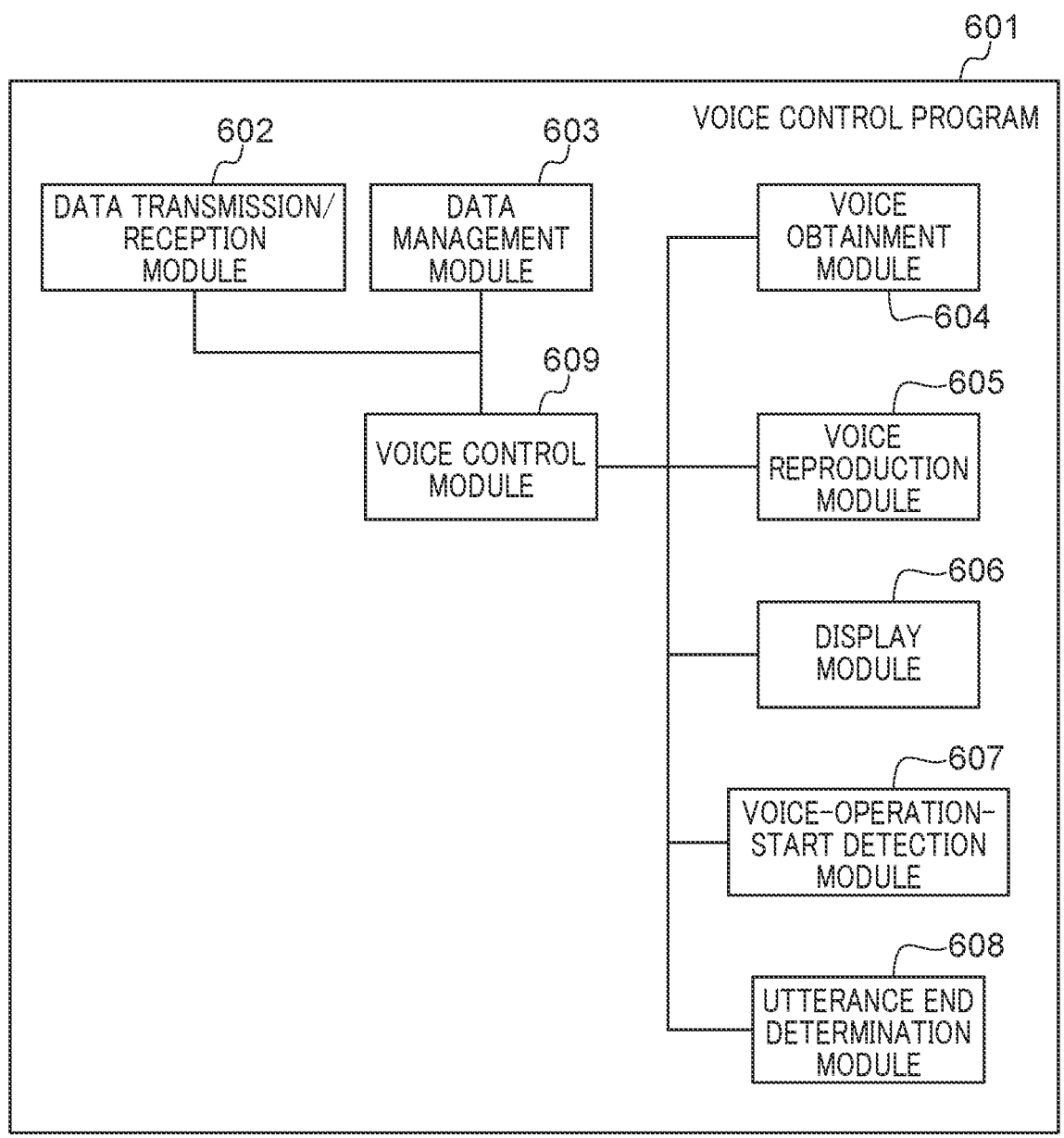
FIG. 6 is a block diagram showing a functional configuration of a voice control program that a CPU of the voice control apparatus in FIG. 3 runs.

FIG. 6 is a block diagram showing a functional configuration of the voice control program 601 that the CPU 302 of the voice control apparatus 100 in FIG. 3 runs. The voice control program 601 is stored in the external storage unit 305 as mentioned above. The CPU 302 develops the voice control program 601 onto the RAM 303 on boot and runs it. The voice control program 601 consists of a data transmission/reception module 602, a data management module 603, a voice obtainment module 604, a voice reproduction module 605, a display module 606, a voice-operation-start detection module 607, an utterance end determination module 608, and a voice control module 609.

The data transmission/reception module 602 transmits and receives data with another apparatus on the network 104 by TCP/IP through the network I/F 306. The data transmission/reception module 602 transmits the voice data obtained from the voice obtainment module 604 to the server 102. Moreover, the data transmission/reception module 602 also receives combined voice data (a response to the user 106) generated by the server 102.

The data management module 603 stores various data like work data etc. that are generated during execution of the voice control program 601 in a predetermined area of the external storage unit 305 and manages it. For example, volume setting data of voice reproduced by the voice reproduction module 605, authentication information required for communication with the gateway 105, device information required for communication with the server 102 and the image forming apparatus 101, a URL of a program are stored and managed.

The voice obtainment module 604 converts analog voice of the user 106 near the voice control apparatus 100 obtained with the microphone 308 into voice data and temporarily stores the voice data concerned in the RAM 303. The voice of the user 106 is converted into a predetermined format like MP3, is coded to be transmitted to the server 102, and is temporarily stored in the RAM 303 as the voice data. A start timing and an end timing of the process by the voice obtainment module 604 are managed by the voice control module 609. It should be noted that the coding format may be a general-purpose streaming format and that the data transmission/reception module 602 may sequentially transmit the coded voice data.

The voice reproduction module 605 reproduces the combined voice data, which is received by the data transmission/reception module 602, with the speaker 310 through the audio controller 309. A voice reproduction timing of the voice reproduction module 605 is managed by the voice control module 609. The display module 606 controls lighting of the LED 312 through the display controller 311. For example, when the voice-operation-start detection module 607 detects a voice operation, the display module 606 lights the LED 312. A lighting timing of the display module 606 is managed by the voice control module 609.

When detecting utterance of a wake word by the user 106, press of the operation start key (not shown) of the voice control apparatus 100, or receipt of a voice control start command by the data transmission/reception module 602, the voice-operation-start detection module 607 transmits an operation start notification to the voice control module 609. In the description, the wake word is a predetermined voice word for starting a voice operation of the voice control apparatus 100. The voice-operation-start detection module 607 always checks the wake word in the analog voice of the user 106 who is adjacent to the voice control apparatus 100 obtained with the microphone 308. The user 106 can operate the image forming apparatus 101 by uttering the wake word and by uttering an operation instruction continuously.

The utterance end determination module 608 determines an end timing of the process by the voice obtainment module 604. For example, when the voice of the user 106 breaks off in a predetermined period (for example, 3 seconds), the utterance end determination module 608 determines that the utterance of the user 106 is finished, and transmits an utterance end notification to the voice control module 609. It should be noted that the utterance end may be determined by a predetermined word that the user 106 utters in place of a no-utterance period (hereinafter referred to as a blank period). For example, when a predetermined word, such as "yes", "no", "OK", "cancel", "finish", or "start", is detected, the utterance end may be determined without waiting for the predetermined period. Moreover, the utterance end may be determined by the server 102 not by the voice control apparatus 100. The utterance end may be determined on the basis of meaning and context of contents of utterance of the user 106.

The voice control module 609 is the center of control and controls so that other modules in the voice control program 601 cooperate and operate mutually. Specifically, the voice control module 609 controls starts and ends of processes of the voice obtainment module 604, voice reproduction module 605, and display module 606. Moreover, the voice control module 609 controls so that the data transmission/reception module 602 transmits the voice data concerned to the server 102 after the voice obtainment module 604 converts the voice obtained with the microphone 308 into the voice data. Moreover, the voice control module 609 controls so that the voice reproduction module 605 reproduces the combined voice data after the data transmission/reception module 602 receives the combined voice data from the server 102.

The timings of starts and ends of the processes of the voice obtainment module 604, voice reproduction module 605, and display module 606 will be described.

The voice control module 609 starts the process of the voice obtainment module 604 when receiving the operation start notification from the voice-operation-start detection module 607. Moreover, the voice control module 609 finishes the process of the voice obtainment module 604 when receiving the utterance end notification from the utterance end determination module 608. For example, the user 106 shall utter the wake word and continuously shall utter "start copy". At this time, the voice-operation-start detection module 607 detects the voice of the wake word and transmits the operation start notification to the voice control module 609. The voice control module 609 controls to start the process of the voice obtainment module 604, when receiving the operation start notification. The voice obtainment module 604 converts the analog voice "start copy" uttered following the wake word into the voice data and stores the voice data concerned temporarily. When determining that the blank period after the utterance "start copy" is longer than the predetermined period, the utterance end determination module 608 transmits the utterance end notification to the voice control module 609. When receiving the utterance end notification, the voice control module 609 finishes the process of the voice obtainment module 604. It should be noted that the state between the start and end of the process by the voice obtainment module 604 is called an utterance processing state. The display module 606 lights the LED 312 in the utterance processing state.

After the utterance end determination of the user 106, the voice control module 609 controls the data transmission/reception module 602 to transmit the voice data to the server 102 and waits for a response from the server 102. For example, the response from the server 102 consists of a header section showing that it is a response and combined voice data for reproducing a response message. When the data transmission/reception module 602 receives the response from the server 102, the voice control module 609 controls the voice reproduction module 605 to reproduce the combined voice data included in the response from the server 102. The combined voice data reproduces a message "copy screen is displayed", for example. It should be noted that the state after the utterance end determination until finishing reproduction of the combined voice data shall be called a response processing state. The display module 606 blinks the LED 312 in the response processing state.

After the response process, while the interactive session with the server 102 is continuing, the user 106 can continuously utter words to perform a desired process without uttering the wake word. The interactive session is finished when the server 102 transmits an interactive session end notification to the voice control apparatus 100. It should be noted that the state from the end of the interactive session to the start of the following interactive session shall be called a standby state. The voice control apparatus 100 will be in the standby state until the voice control apparatus 100 receives the operation start notification from the voice-operation-start detection module 607. The display module 606 turns off the LED 312 in the standby state.

Figure 7:
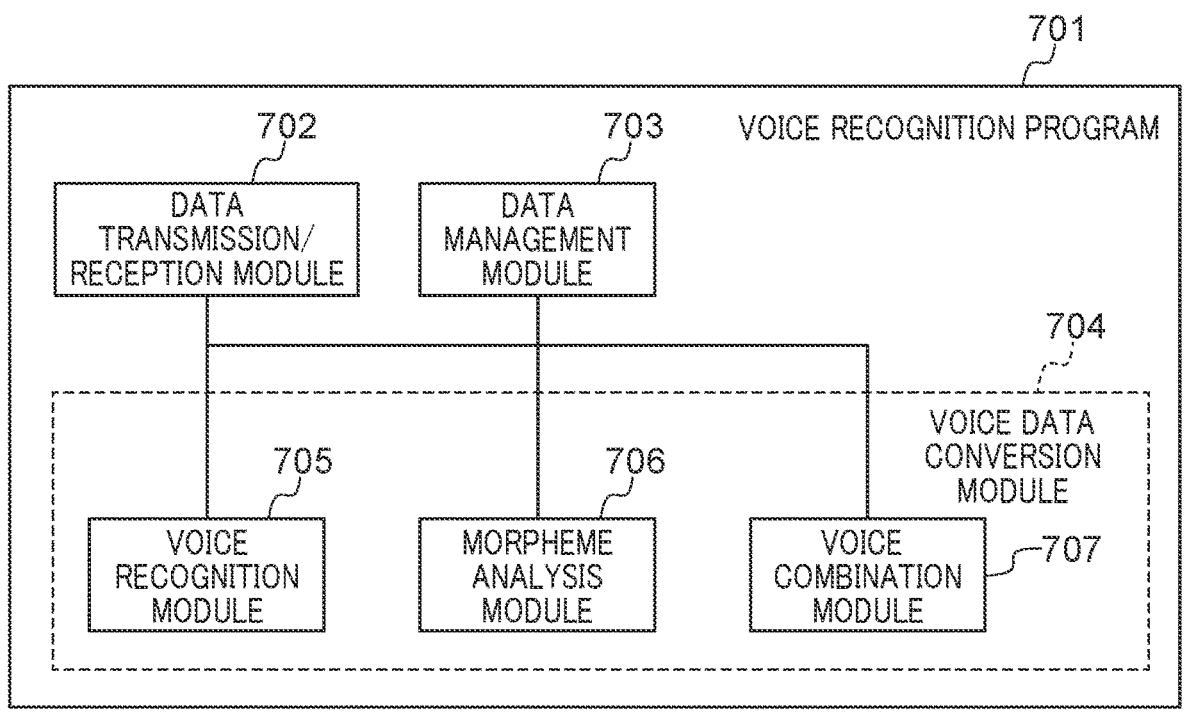
FIG. 7 is a block diagram showing a functional configuration of a voice recognition program that a CPU of the server in FIG. 4 runs.

FIG. 7 is a block diagram showing a functional configuration of the voice recognition program 701 that the CPU 402*a* of the server 102 in FIG. 4 runs. The voice recognition program 701 is stored in the external storage unit 405*a* as mentioned above. The CPU 402*a* develops the voice recognition program 701 onto the RAM 403*a* on boot and runs it. The voice recognition program 701 consists of a data transmission/reception module 702, a data management module 703, and a voice data conversion module 704.

The data transmission/reception module 702 transmits and receives data with another apparatus on the network 104 by TCP/IP through the network I/F 406*a*. The data transmission/reception module 702 receives the voice data of the user 106 from the voice control apparatus 100.

The data management module 703 stores various data, such as work data generated in execution of the voice recognition program 701 and parameters that are required for execution of the voice recognition process by the voice data conversion module 704, in the predetermined area of the external storage unit 405a and manages the data. For example, the data management module 703 stores an acoustic model and a language model that are used to convert the voice data received by the data transmission/reception module 702 into a text (text information) in the predetermined area of the external storage unit 405a and manages them. Moreover, the data management module 703 stores a dictionary that is used to perform the morphological analysis of a text by a morphological analysis module 706 mentioned later in the predetermined area of the external storage unit 405a and manages it. Moreover, the data management module 703 stores a voice database that is used to combine voices by a voice combination module 707 mentioned later in the predetermined area of the external storage unit 405a and manages it. Furthermore, the data management module 703 stores device information required for communications with the voice control apparatus 100 and image forming apparatus 101 and manages it.

The voice data conversion module 704 consists of a voice recognition module 705, the morphological analysis module 706, and the voice combination module 707. The voice recognition module 705 performs the voice recognition process for converting the voice data of the user 106 received by the data transmission/reception module 702 into a text. The voice recognition process converts the voice data of the user 106 into phonemes using the acoustic model and converts the phonemes into the data of actual text format by pattern matching using the language model. It should be noted that the acoustic model may be a model that uses the machine learning technique by a neural network like DNN-HMM or may be a model that uses a different technique like GMM-HMM. In the machine learning using the neural network, the learning model is learned on the basis of teacher data that pairs voice and text, for example. The language model may be a model that uses the machine learning technique by the neural network like RNN or may be a model that uses a different technique like the N-gram method.

In the embodiment, the data of the above-mentioned text format shall consist of a text that consists of one or more characters (a numerical character, an alphabet, a symbol, etc. may be included). In the case of Japanese, the data shall consist of a text to which kana-kanji conversion has been applied. However, another method may be used as the voice recognition process that converts voice data into data of the text format and a method is not restricted to the method mentioned above.

The morphological analysis module 706 applies the morphological analysis to the data of the text format converted by the voice recognition module 705. The morphological analysis deduces a morpheme string from the dictionary, which has the grammar of the language and information about word classes, and determines the word class of each morpheme. The morphological analysis module 706 can be achieved using the well-known morphological analysis software, such as JUMAN, ChaSen, and MeCab in the case of Japanese, and Tree Tagger in the case of English. For example, the morphological analysis module 706 analyzes the data "kopiwoshitai (I want to copy)" in the Japanese text format converted by the voice recognition module 705 as the morpheme string "kopi", "wo", "shi", and "tai". Moreover, the data "A3karaA4he (from A3 to A4)" is analyzed as the morpheme string "A3", "kara", "A4", and "he".

The voice combination module 707 performs a voice combination process on the basis of the notification received from the image forming apparatus 101. The voice combination process converts a predetermined text that is paired to a predetermined notification into combined voice data in a predetermined format, such as MP3. A voice combination process generates combined voice data on the basis of the voice database stored in the data management module 703, for example. The voice database collects voices that are utterances of contents of fixed forms, such as words, for example. Although the voice combination process is performed using the voice database in the embodiment, the voice combination process may be performed by another method. The method is not limited to the method using the voice database.

Figure 8A:
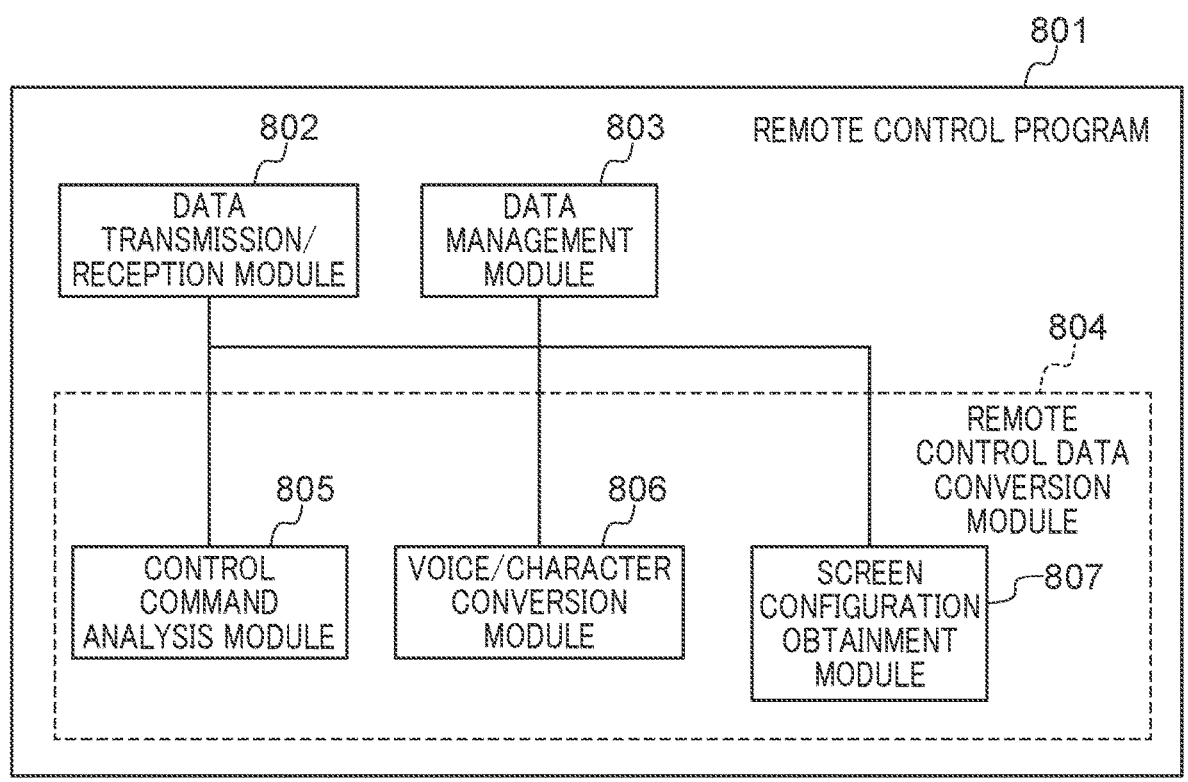
FIG. 8A is a block diagram showing a functional configuration of a remote control program that the CPU of the server in FIG. 4 runs.

FIG. 8A is a block diagram showing a functional configuration of a remote control program 801 that the CPU 402b of the server 102 in FIG. 4 runs. The remote control program 801 is stored in the external storage unit 405b as mentioned above. The CPU 402b develops the remote control program 801 onto the RAM 403b on boot and runs it. The remote control program 801 consists of a data transmission/reception module 802, a data management module 803, and a remote control data conversion module 804.

The data transmission/reception module 802 transmits and receives data with another apparatus on the network 104 by TCP/IP through the network I/F 406b. Moreover, the data transmission/reception module 802 receives text data (word information) obtained from the voice recognition program 701 by performing the morphological analysis. This text data is the data in the text format that consists of one or more morphemes obtained by the voice recognition program 701 performing the morphological analysis to the voice data of the user 106.

The data management module 803 stores various data like parameters required for the remote control of the image forming apparatus 101 based on the voice of the user 106 obtained by the voice control apparatus 100 in the predetermined area of the external storage unit 405b and manages the data. Specifically, the data management module 803 stores and manages screen information, UI widget information, a voice recognition message, an operation instruction, and a filter word that are shown in FIG. 8B.

The screen information indicates a type of a screen, such as a home screen and a copy screen, displayed on the touch panel 200 of the image forming apparatus 101. It should be noted that the data management module 803 manages the screen information about all page screens of a screen like the home screen that has a plurality of page screens that are switchable by tabs in the embodiment.

The UI widget information indicates a name of a UI widget displayed on a screen shown by a screen type. For example, the names of the UI widgets, such as the copy button 202, scan button 203, menu button 204, and the tub numbers, shown in FIG. 2 are managed as the UI widget information. Although the embodiment describes the case where the name of the UI widget is managed as the UI widget information, a feature other than the name may be managed as long as the feature indicates the information about the UI widget. For example, the UI widget may be managed by coordinate information that shows a displayed position of the UI widget on the screen or managed by a display form (a button, an icon, an input box, or the like) of the UI widget.

The voice recognition message indicates a phrase for recognizing the UI widget shown by the UI widget information by voice. Moreover, the voice recognition message includes at least one word related to the process executed by the function corresponding to the UI widget concerned and has a semantic relation to the executed process concerned. The different voice recognition messages are set to the respective UI widgets. It should be noted that there is no voice recognition message about the secure print 206 that does not allow the voice operation from a viewpoint of security. This is denoted by "-" in FIG. 8B. The remote control program 801 specifies the UI widget that is subjected to the voice operation on the basis of the UI widget information and the voice recognition message that are managed by the data management module 803.

An operation instruction is transmitted to the image forming apparatus 101 from the server 102, when the text data received from the voice recognition program 701 matches the voice recognition message. The filter word is used to perform filter display of one or more UI widgets displayed on the touch panel 200. During the filter display, one or more target UI widgets are extracted by filtering and the extracted target UI widgets are displayed on the touch panel 200. A unique filter word is set to each function group to which UI widgets belong. For example, the filter word "copy" is set to the group of the UI widgets relevant to the copy function. And the filter word "scan" is set to the group of the UI widgets relevant to the scan function. If a filter word matches a voice recognition message, filter display becomes impossible. Accordingly, a filter word consists of a word different from a voice recognition message, such as a part of words constituting the voice recognition message and a different word that has meaning similar to the voice recognition message.

The remote-control-data conversion module 804 consists of a control command analysis module 805, voice/character conversion module 806, and screen configuration obtainment module 807. The control command analysis module 805 compares the text data received from the voice recognition program 701 with the voice recognition messages that the data management module 803 manages. When the managed voice recognition messages include the voice recognition message that matches the text data, the remote-control-data conversion module 804 transmits the operation instruction corresponding to this voice recognition message to the image forming apparatus 101. In the meantime, when the managed voice recognition messages are not coincident with the text data, the remote-control-data conversion module 804 compares the text data with the filter words that the data management module 803 manages. When the managed filter words include the filter word that matches the text data, the remote-control-data conversion module 804 transmits the voice recognition message corresponding to this filter word and the UI widget information corresponding to the voice recognition message to the image forming apparatus 101.

The voice/character conversion module 806 transmits the text information about the voice data output from the speaker 310 of the voice control apparatus 100 to the voice recognition program 701 in response to reception of a screen update notification mentioned later from the image forming apparatus 101.

The screen configuration obtainment module 807 requests the data management module 803 to store the screen information and UI widget information received from the image forming apparatus 101 after transmitting the operation instruction. Moreover, the screen configuration obtainment module 807 requests the data transmission/reception module 802 to transmit the voice recognition messages that will be displayed in association with the UI widget included on the screen displayed on the touch panel 200 of the image forming apparatus 101 to the image forming apparatus 101.

Figure 9:
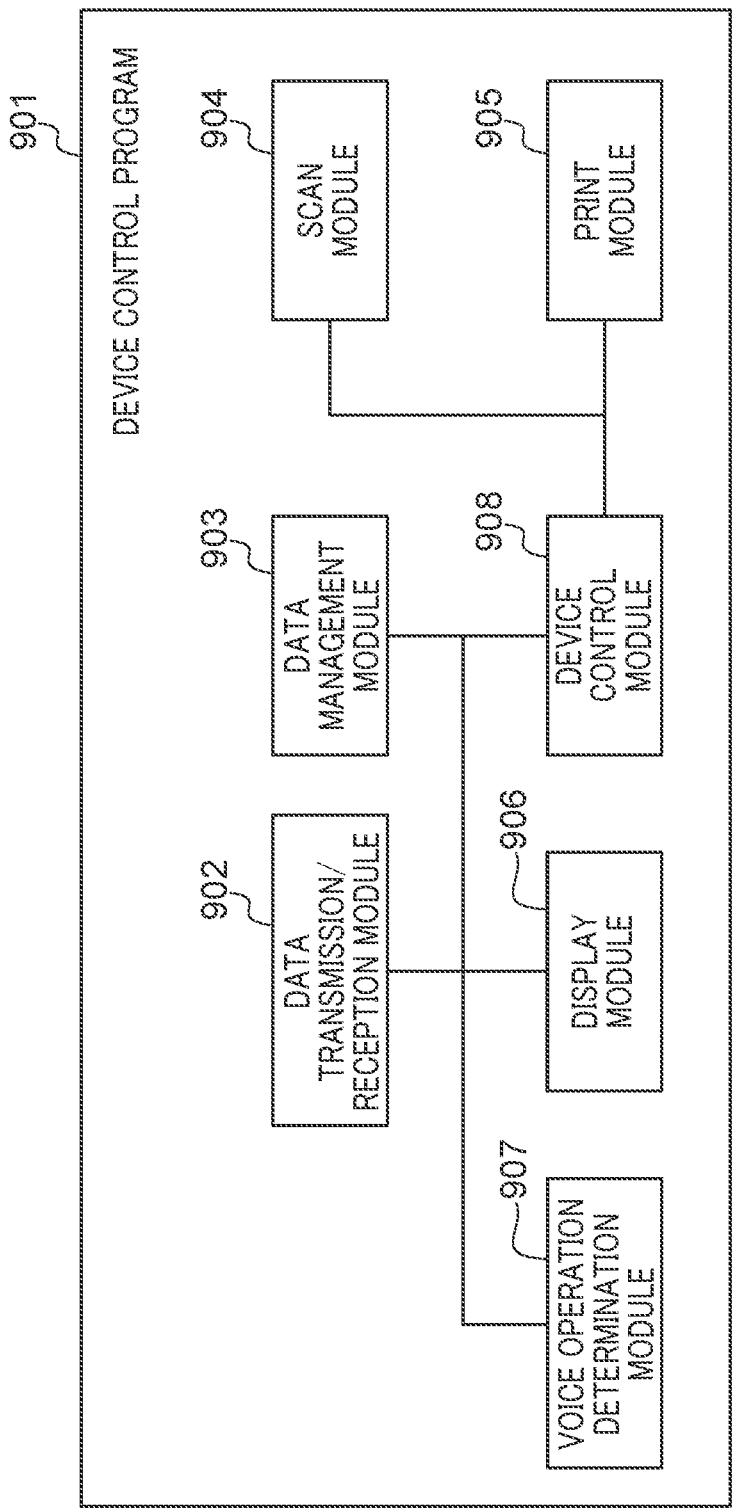
FIG. 9 is a block diagram showing a functional configuration of a device control program that a CPU of the image forming apparatus in FIG. 5 runs.

FIG. 9 is a block diagram showing a functional configuration of a device control program 901 that the CPU 502 of the image forming apparatus 101 in FIG. 5 runs. The device control program 901 is stored in the external storage unit 505 as mentioned above. The CPU 502 develops the device control program 901 onto the RAM 503 on boot and runs it. The device control program 901 consists of a data transmission/reception module 902, a data management module 903, a scan module 904, a print unit 905, a display unit 906, a voice operation determination module 907, and a device control module 908.

The data transmission/reception module 902 transmits and receives data with another apparatus on the network 104 by TCP/IP through the network I/F 506. For example, the data transmission/reception module 902 receives the operation instruction and the filter display instruction from the server 102. Moreover, the data transmission/reception module 902 transmits the screen update notification showing that the screen display contents of the touch panel 200 have been updated and the job execution state notification that shows the state of the job to the server 102.

The data management module 903 stores the various data, such as the work data generated by execution of the device control program 901 and the setting parameters required for controlling the devices, in the predetermined areas of the RAM 503 and external storage unit 505 and manages the data. For example, the setting items of the job executed by the device control module 908, the job data constituted by the combination of the set values, and the attribute information about sheets are managed. Moreover, the authentication information required for communication with the gateway 105, the device information required for communication with the server 102, and the URL are managed. Moreover, the image data that is subjected to the image formation by the image forming apparatus 101 is stored and managed. Moreover, the screen control information that the display module 906 uses for screen display control and the voice operation determination information that the voice operation determination module 907 uses to determine an operation are stored. The screen control information and voice operation determination information are managed for each screen that the display module 906 displays. Moreover, instructions and control means for booting the voice recognition and voice operation through the network I/F 506 or another boot means are managed.

The scan module 904 executes the scan with the scanner 515 through the scan controller 514 on the basis of the scan job parameter setting of the device control module 908 and stores the read image data with the management module 903. The print module 905 executes the print with the print engine 513 through the print controller 512 on the basis of the print job parameter setting of the device control module 908.

The display module 906 controls the operation panel 108 through the display controller 507. The display module 906 displays the UI widgets (buttons, pulldown lists, check boxes, etc.) that the user can operate on the touch panel 200 on the basis of the above-mentioned screen control information. Moreover, the display module 906 obtains a coordinate that indicates a touched position on the touch panel 200 through the operation I/F 508. Then, the display module 906 determines the UI widget that is subjected to the operation and also determines contents of a process at the time of receiving the operation. The display module 906 updates the contents of the screen displayed on the touch panel 200 according to the determined contents of the process or transmits the parameters of the job set up by the user's operation and a start instruction of the job concerned to the device control module 908. Moreover, when the voice operation is started, as shown in FIG. 11A mentioned later, the display module 906 displays voice recognition messages in association with the UI widgets. Then, the display module 906 updates the contents of the screen displayed on the touch panel 200 according to the voice operation determination result of the voice operation determination module 907 or transmits the parameters of the job set up by the user's operation and a start instruction of the job concerned to the device control module 908.

The voice operation determination module 907 determines the UI widget that constitutes the screen displayed on the touch panel 200 and is operable by the user as the operation target on the basis of the operation instruction that the data transmission/reception module 902 received from the server 102. For example, when the operation instruction "start copy" is received in the state where the home screen 201 is displayed, the copy screen 1112 in FIG. 11D mentioned later is displayed on the touch panel 200 of the image forming apparatus 101. When the operation instruction "start" is received in this state, the image forming apparatus 101 executes a copy process. In this way, after displaying the status under the voice recognition, the image forming apparatus 101 starts the copy process in a default setting state in the copy screen, when the user 106 utters "copy" and "start" to the voice control apparatus 100.

The device control module 908 instructs control of the print engine 513 and the scanner 515 through the print controller 512 and the scan controller 514. For example, when press of a start key of the touch panel 200 is detected in the state where the copy screen 1112 in FIG. 11D mentioned later is displayed on the touch panel 200, the device control module 908 receives the parameters of the copy job and the job start instruction from the display module 906. The device control module 908 controls the print engine 513 so as to print the image data read with the scanner 515 onto a sheet on the basis of the job parameters.

Figure 10:
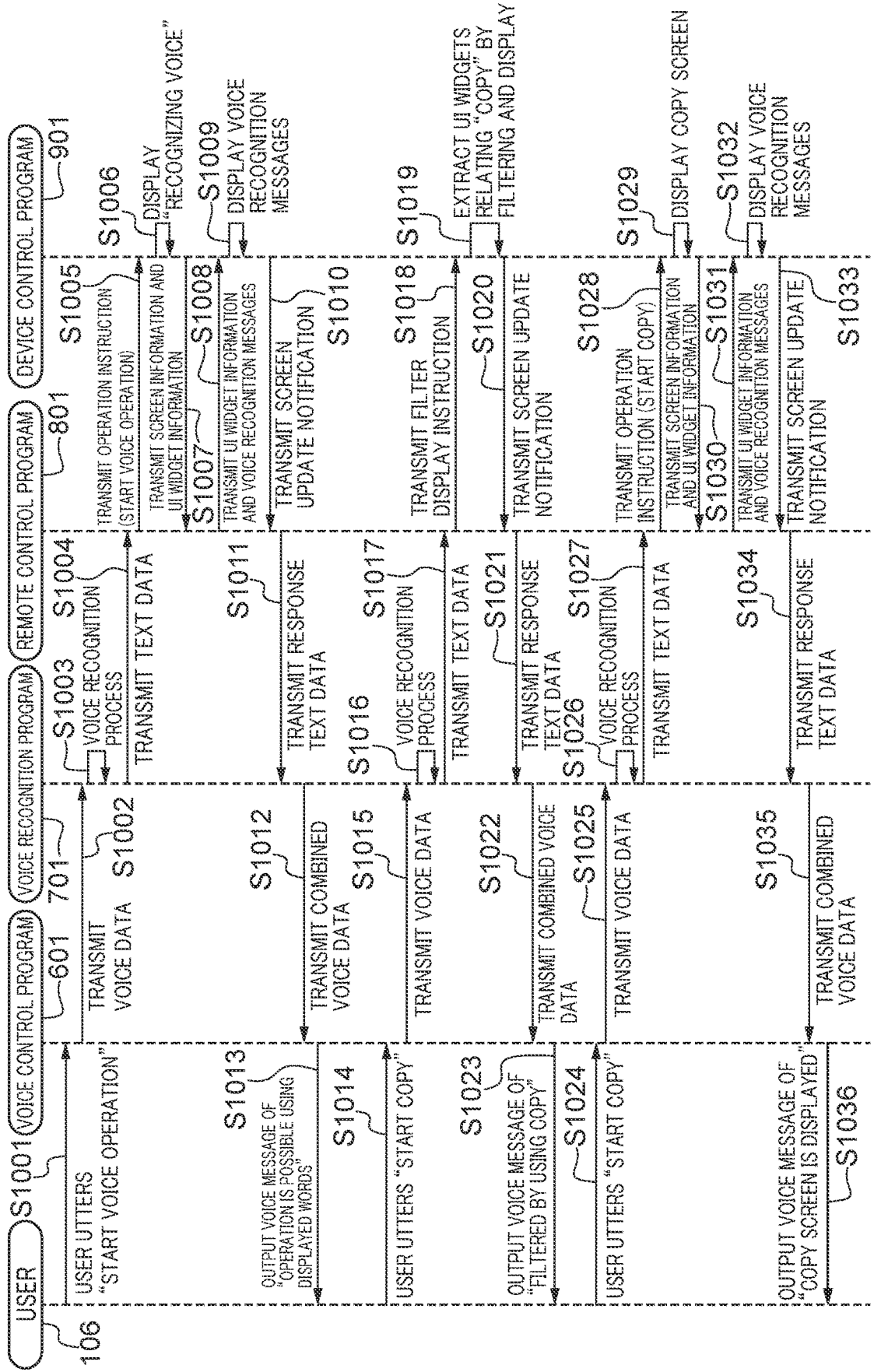
FIG. 10 is a sequence chart showing procedures of a voice operation control process executed by the information processing system according to the embodiment.

FIG. 10 is a sequence chart showing procedures of a voice operation control process executed by the information processing system according to the embodiment. In the embodiment, the CPU 302 of the voice control apparatus 100 develops the voice control program 601 stored in the external storage unit 305 onto the RAM 303 and runs it. Moreover, the CPU 402a of the server 102 develops the voice recognition program 701 stored in the external storage unit 405a onto the RAM 403a and runs it. The CPU 402b develops the remote control program 801 stored in the external storage unit 405 onto the RAM 403b and runs it. Furthermore, the CPU 502 of the image forming apparatus 101 develops the device control program 901 stored in the external storage unit 505 onto the RAM 503 and runs it. Thereby, the voice operation control process in FIG. 10 is achieved. FIG. 10 describes a case where the user 106 utters "start voice operation", "copy", and "start copy" as an example. The display control process in FIG. 10 assumes that the image forming apparatus 101 starts and the home screen 201 is displayed on the touch panel 200.

In FIG. 10, the user 106 utters "start voice operation" to the microphone 308 of the voice control apparatus 100 first (step S1001). The voice control program 601 stores "start voice operation" that the user 106 uttered into the external storage unit 305 as voice data. Next, the voice control program 601 transmits the voice data "start voice operation" to the server 102 (step S1002).

The voice recognition program 701 of the server 102 performs the voice recognition process based on the received voice data (step S1003). Specifically, the voice recognition program 701 stores the received voice data into the external storage unit 405a and converts the voice data concerned into text data with the voice recognition module 705. Next, the voice recognition program 701 transmits the converted text data to the remote control program 801 (step S1004).

The remote control program 801 specifies the operation instruction corresponding to the received text data (specifically, "start voice operation") from among the operation instructions that the data management module 803 manages and transmits the specified instruction to the image forming apparatus 101 (step S1005).

When receiving the operation instruction "start voice operation", the device control program 901 of the image forming apparatus 101 displays a message showing that a voice operation is available (specifically, "recognizing voice") in the status display area 210 on the home screen 201 (step S1006). Next, the device control program 901 transmits screen information that shows the type of the screen displayed on the touch panel 200 and UI widget information that shows UI widgets included in the screen concerned to the server 102 (step S1007). Specifically, the device control program 901 transmits the screen information "home screen 201" that shows the home screen 201 displayed on the touch panel 200 to the server 102.

The remote control program 801 of the server 102 specifies one or more pieces of UI widget information corresponding to the home screen 201 on the basis of the screen information received from the image forming apparatus 101 from among the pieces of UI widget information that the data management module 803 manages. Moreover, the remote control program 801 specifies one or more voice recognition messages corresponding to the specified UI widget information from among the voice recognition messages that the data management module 803 manages. The remote control program 801 transmits all the pieces of specified UI widget information and all the specified voice recognition messages to the image forming apparatus 101 (step S1008).

The device control program 901 of the image forming apparatus 101 displays a voice recognition message as an utterance example in association with each UI widget displayed on the home screen 201 on the basis of the received UI widget information (step S1009). Specifically, the device control program 901 displays a balloon 1101 including "start copy", which is a voice recognition message of the copy button 202, as shown in FIG. 11A in association with the copy button 202 that is an example of a UI widget that allows the voice operation. Moreover, the device control program 901 displays a balloon 1102 showing that the voice operation is impossible in association with the secure print button 206 that is an example of a UI widget that prohibits the voice operation as shown in FIG. 11A. Furthermore, the device control program 901 displays a message "operate with voice by uttering displayed word" in the status display area 210 and displays a balloon 1103 including "erase word" in association with the status display area 210 as shown in FIG. 11A. The voice recognition message "erase word" is used to hide the voice recognition messages that are displayed on the screen of the touch panel 200. Next, the device control program 901 transmits the screen update notification showing that the screen display contents of the touch panel 200 have been updated to the server 102 (step S1010).

When receiving the screen update notification, the remote control program 801 of the server 102 transmits response text data, which is a response message with respect to the content that the user 106 uttered in the step S1001, to the voice recognition program 701 (step S1011). Specifically, the remote control program 801 transmits the response text data including a message "operation is possible using displayed words" to the voice recognition program 701. The voice recognition program 701 converts the received response text data into combined voice data and transmits the combined voice data concerned to the voice control apparatus 100 (step S1012).

The voice control program (a voice output control unit) 601 of the voice control apparatus 100 outputs the received combined voice data from the speaker 310. Specifically, the voice control program 601 outputs a voice message "operation is possible using displayed words" from the speaker 310 (step S1013). In this way, the voice operation of the image forming apparatus 101 becomes available when the user 106 utters "start voice operation" to the microphone 308 in the embodiment.

After that, when the user 106 utters "copy" to the microphone 308 of the voice control apparatus 100 (step S1014), the voice control program 601 stores voice data "copy" that the user 106 uttered into the external storage unit 305. Next, the voice control program 601 transmits the voice data "copy" to the server 102 (step S1015).

The voice recognition program 701 of the server 102 performs the voice recognition process based on the received voice data (step S1016) as with the step 1003. Next, the voice recognition program 701 transmits the converted text data to the remote control program 801 (step S1017). Next, the remote control program 801 compares the received text data with the information which the data management module 803 manages. Specifically, the remote control program 801 compares the received text data with the voice recognition messages that the data management module 803 manages. For example, the voice recognition messages in FIG. 8B that the data management module 803 manages do not include a voice recognition message that matches the received text data "copy". In this case, the remote control program 801 compares the received text data with the filter words that the data management module 803 manages. For example, the filter words in FIG. 8B that the data management module 803 manages include a filter word that matches "copy". In this case, the remote control program 801 specifies one or more pieces of UI widget information of which the corresponding filter word is "copy" from among the pieces of UI widget information that the data management module 803 manages. Moreover, the remote control program 801 specifies one or more voice recognition messages corresponding to the specified UI widget information from among the voice recognition messages that the data management module 803 manages. The remote control program 801 transmits a filter display instruction that includes all the pieces of specified UI widget information and all the specified voice recognition messages to the image forming apparatus 101 (step S1018).

The device control program 901 of the image forming apparatus 101 extracts the UI widgets relevant to "copy" by filtering and displays the extracted UI widgets according to the received filter display instruction (step S1019). Thereby, a home screen 1104 shown in FIG. 11B is displayed on the touch panel 200. The home screen 1104 includes UI widgets relevant to "copy", such as the copy button 202, a show-through prevention copy button 1105, a toner save copy button 1106, a preset ID card copy button 1107, a thickening character copy button 1108, a passport copy button 1109, and an ID card copy button 1110. Moreover, the voice recognition messages are additionally displayed as utterance examples in association with these UI widgets as with the above-mentioned step S1009. Furthermore, the message "copy related widgets are extracted by filtering and displayed" is displayed in the status display area 210. In the step S1019, the device control program 901 may display a list that collects the functions relevant to "copy" like a balloon 1111 in FIG. 11C. In this way, when the functions relevant to "copy" are displayed as the list, a user can find a desired function easily, and operability of a voice operation is improved. Moreover, when all the UI widgets relevant to "copy" cannot be displayed on the home screen, the UI widgets relevant to "copy" are collectively displayed on a popup screen so as to be scrolled in the embodiment. When the number of the UI widgets relevant to "copy" is more than the predetermined number set up beforehand, the voice control apparatus 100 may be controlled so as to output a voice message "matched items are too many". Next, the device control program 901 transmits the screen update notification showing that the screen display contents of the touch panel 200 have been updated to the server 102 (step S1020). The screen update notification includes the screen information showing the type of the screen displayed on the touch panel 200 in the step S1019.

When receiving the screen update notification, the remote control program 801 of the server 102 stores the screen information included in the screen update notification into the external storage unit 405b. Moreover, the remote control program 801 transmits the response text data including the message "filtered by using copy" to the voice recognition program 701 (step S1021). The voice recognition program 701 converts the received response text data into combined voice data and transmits the combined voice data concerned to the voice control apparatus 100 (step S1022).

The voice control program 601 of the voice control apparatus 100 outputs the received combined voice data from the speaker 310. Specifically, the voice control program 601 outputs a voice message "filtered by using copy" from the speaker 310 (step S1023). In this way, when the user 106 utters "copy" to the microphone 308, the UI widgets relevant to "copy" are extracted by filtering and displayed on the touch panel 200 of the image forming apparatus 101 in the embodiment.

After that, the user 106 utters "start copy" to the microphone 308 of the voice control apparatus 100 (step S1024). The voice control program 601 stores "start copy" that the user 106 uttered into the external storage unit 305 as voice data. Next, the voice control program 601 transmits the voice data "start copy" to the server 102 (step S1025).

The voice recognition program 701 of the server 102 executes the voice recognition process (step S1026) on the basis of the received voice data as with the step S1003 mentioned above and transmits the converted text data to the remote control program 801 (step S1027).

The remote control program 801 specifies the operation instruction corresponding to the received text data (specifically, "start copy") from among the operation instructions that the data management module 803 manages and transmits the specified instruction to the image forming apparatus 101 (step S1028).

When receiving the operation instruction ("start copy"), the device control program 901 of the image forming apparatus 101 displays the copy screen for executing a copy job on the touch panel 200 (step S1029). Furthermore, at this time point, voice recognition messages like that shown in FIG. 11A are not displayed on the copy screen. Next, the device control program 901 transmits screen information that shows the type of the screen displayed on the touch panel 200 and UI widget information that shows UI widgets included in the screen concerned to the server 102 (step S1030).

The remote control program 801 of the server 102 specifies one or more pieces of UI widget information corresponding to the copy screen on the basis of the received screen information from among the pieces of UI widget information that the data management module 803 manages. Moreover, the remote control program 801 specifies one or more voice recognition messages corresponding to the specified UI widget information from among the voice recognition messages that the data management module 803 manages. The remote control program 801 transmits all the pieces of specified UI widget information and all the specified voice recognition messages to the image forming apparatus 101 (step S1031).

The device control program 901 of the image forming apparatus 101 displays a voice recognition message as an utterance example in association with each UI widget displayed on the copy screen 201 on the basis of the received UI widget information (step S1032). In the step S1032, balloons including voice recognition messages corresponding to the respective UI widgets included in the copy screen 1112 shown in FIG. 11D are displayed in association with the UI widgets as utterance examples. Next, the device control program 901 transmits the screen update notification including the screen information that shows the type of the screen displayed on the touch panel 200 to the server 102 (step S1033).

When receiving the screen update notification, the remote control program 801 of the server 102 transmits response text data, which is a response message with respect to the content that the user 106 uttered in the step S1024, to the voice recognition program 701 (step S1034). Specifically, the remote control program 801 transmits the response text data including a message "copy screen is displayed" to the voice recognition program 701. The voice recognition program 701 converts the received response text data into combined voice data and transmits the combined voice data concerned to the voice control apparatus 100 (step S1035).

The voice control program 601 of the voice control apparatus 100 outputs the received combined voice data from the speaker 310. Specifically, the voice control program 601 outputs a voice message "copy screen is displayed" from the speaker 310 (step S1036).

As mentioned above, the voice operation of the image forming apparatus 101 is performed on the basis of the voice of the user that the voice control apparatus 100 obtains in the embodiment.

Although the processes in FIG. 10 show the case where the voice recognition messages are displayed in association with the UI widgets, the voice recognition messages can be hidden.

For example, when the user 106 utters "erase words" to the microphone 308 in the state where the voice recognition messages are displayed in association with the UI widgets included in the home screen 201 as shown in FIG. 11A, the voice control apparatus 100 transmits voice data "erase words" to the server 102.

The server 102 performs the voice recognition process on the basis of the received voice data to generate the text data. The server 102 specifies the operation instruction corresponding to the above-mentioned text data from among the operation instructions that the data management module 803 manages and transmits the specified operation instruction (specifically, "erase words") to the image forming apparatus 101.

When receiving the operation instruction ("erase words"), the image forming apparatus 101 hides the voice recognition messages on the home screen 201. Thereby, the home screen 201 (see FIG. 2) that includes no voice recognition message is displayed on the touch panel 200. Next, the image forming apparatus 101 transmits the screen update notification including the screen information that shows the type of the screen displayed on the touch panel 200 to the server 102.

When receiving the screen update notification, the server 102 converts the response text data showing the response message with respect to the content uttered by the user 106 into the combined voice data and transmits the combined voice data concerned to the voice control apparatus 100.

The voice control apparatus 100 outputs the received combined voice data from the speaker 310. Specifically, the voice control program 601 outputs the voice message "words are hidden and voice operation is available" from the speaker 310.

In this way, display and non-display of the voice recognition messages can be easily switched on the basis of the voice that the user uttered in the embodiment.

Next, operations of the image forming apparatus 101, server 102, and voice control apparatus 100 for achieving the voice operation of the information processing system in the embodiment will be described.

Figure 12:
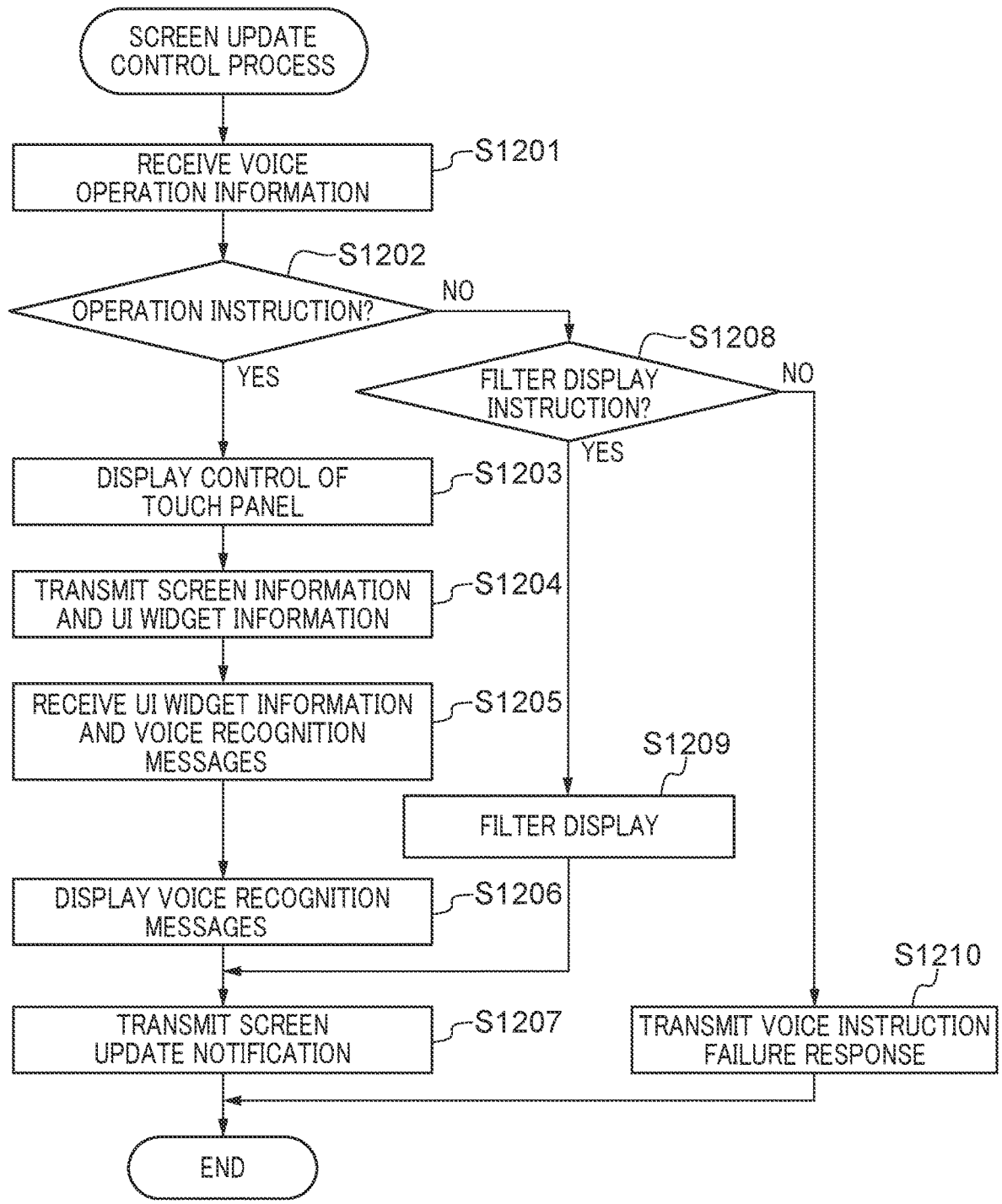
FIG. 12 is a flowchart showing procedures of a screen update control process executed by the device control program in FIG. 9.

FIG. 12 is a flowchart showing procedures of a screen update control process executed by the device control program 901 in FIG. 9. The screen update control process in FIG. 12 is achieved because the CPU 502 of the image forming apparatus 101 develops the device control program 901 stored in the external storage unit 505 onto the RAM 503 and runs it. The screen update control process in FIG. 12 assumes that the image forming apparatus 101 starts and the home screen 201 is displayed on the touch panel 200.

As shown in FIG. 12, when receiving voice operation information, such as the operation instruction or the filter display instruction, from the server 102 (step S1201), the device control program 901 determines whether the received operation information is an operation instruction (step S1202).

As a result of the determination in the step S1202, when the received voice operation information is the operation instruction, the device control program 901 controls the display of the touch panel in accordance with the operation instruction (step S1203). For example, when the operation instruction is "start voice operation", the device control program 901 display "recognizing voice" on the status display area 210 of the home screen 201 (see the step S1006 mentioned above). Moreover, when the operation instruction is "display menu", the device control program 901 displays a menu screen (not shown) on the touch panel 200. Moreover, when the operation instruction is a job execution instruction, the device control program 901 executes the job concerned in parallel. For example, when the operation instruction is an operation instruction of a start button on the copy screen 1112, a copy job is executed and a copy execution screen (not shown) showing that the copy job concerned is under execution is displayed on the touch panel 200.

Next, the device control program 901 transmits screen information that shows the type of the screen displayed on the touch panel 200 and UI widget information that shows UI widgets included in the screen concerned to the server 102 (step S1204). When receiving the screen information from the image forming apparatus 101, the server 102 specifies one or more pieces of UI widget information corresponding to the screen information concerned from among the pieces of UI widget information that the data management module 803 manages. Moreover, the server 102 specifies one or more voice recognition messages corresponding to the specified UI widget information from among the voice recognition messages that the data management module 803 manages. The remote control program 801 transmits all the pieces of specified UI widget information and all the specified voice recognition messages to the image forming apparatus 101.

Next, the device control program 901 receives the UI widget information and the voice recognition messages from the server 102 (step S1205). Next, the device control program 901 displays the voice recognition messages in association with the UI widgets displayed on the touch panel 200 (step S1206). See the steps S1009 and S1032 mentioned above, for example. At this time, if the UI widgets corresponding to the voice recognition messages received from the server 102 are not displayed on the touch panel 200, the device control program 901 may collectively display the voice recognition messages of which the corresponding UI widgets are not displayed as a list like the balloon 1111 in FIG. 11C. Next, the device control program 901 transmits the screen update notification including the screen information that shows the type of the screen displayed on the touch panel 200 to the server 102 (step S1207) and finishes the process.

As a result of the determination in the step S1202, when the received voice operation information is not the operation instruction, the device control program 901 determines whether the received voice operation information is the filter display instruction (step S1208).

As a result of the determination in the step S1208, when the received voice operation instruction is the filter display instruction, the device control program 901 performs the filter display according to the received filter display instruction (step S1209). See the step S1019 mentioned above, for example. As a result of the process in the step S1209, the screen that includes the UI widgets filtered using the word that the user 106 utters to the microphone 308 on the basis of the UI widget information included in the received filter display instruction is displayed on the touch panel 200. Moreover, the voice recognition messages included in the received filter display instruction are displayed in association with the respective UI widgets. After that, the screen update control process proceeds to the step S1207. At this time, the screen update notification transmitted in the step S1207 may include the screen information about the previous screen that was displayed on the touch panel 200 immediately before performing the filter display. Moreover, screen information about a new screen different from the previous screen may be included.

As a result of the determination in the step S1208, when the received voice operation information is not the filter display instruction, the screen update control process proceeds to a step S1210. For example, when the voice operation information shows the operation instruction of the secure print 206 that does not allow the voice operation, the received voice operation information is not the filter display instruction. In the step S1210, the device control program 901 transmits the voice operation failure response, which shows that the impracticable instruction is received, to the server 102. After that, the screen update control process is finished. After finishing the screen update control process, the device control program 901 comes into a reception waiting state for the voice operation information from the server 102.

Figure 13:
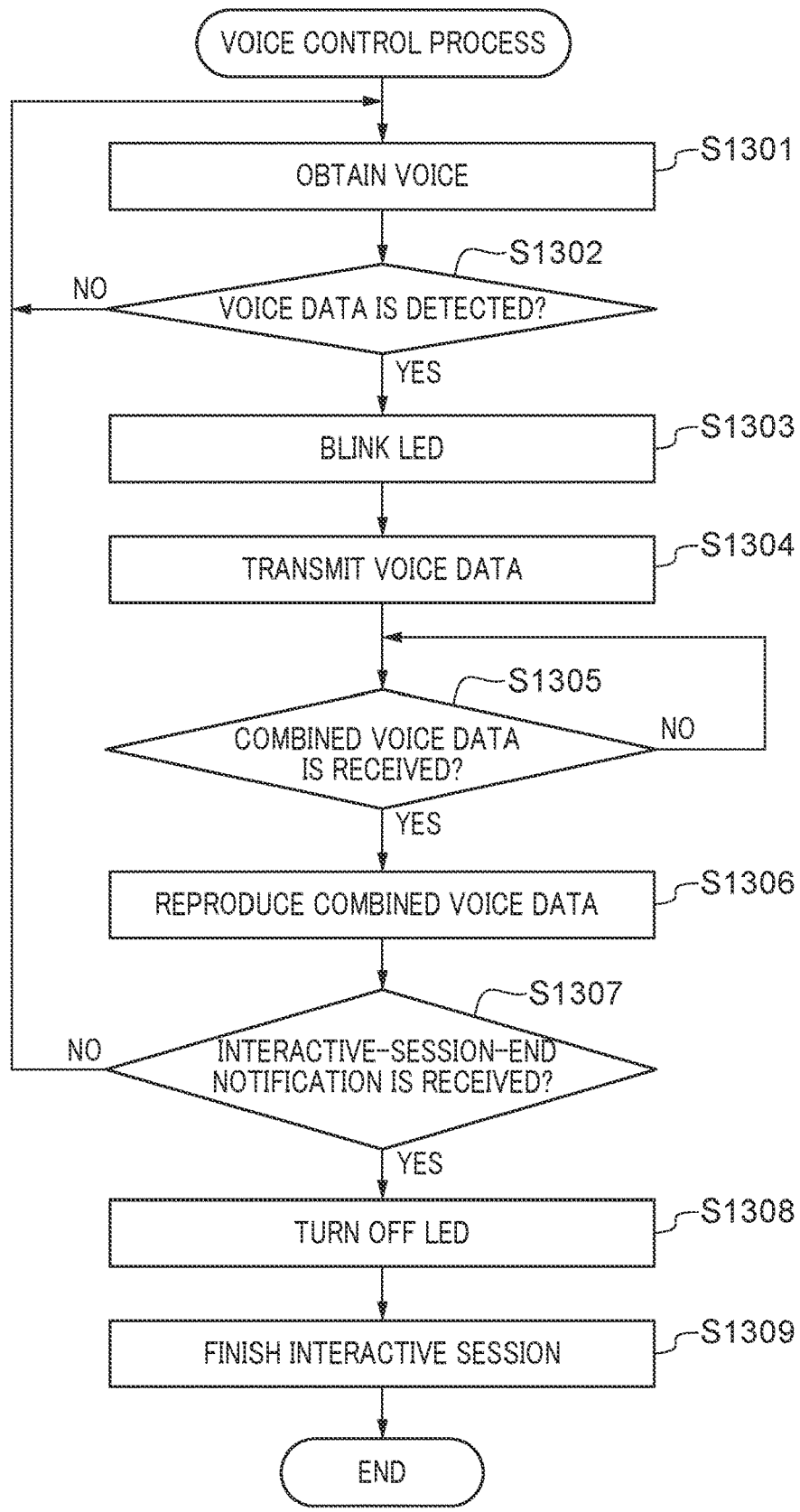
FIG. 13 is a flowchart showing procedures of a voice control process executed by the voice control program in FIG. 6.

FIG. 13 is a flowchart showing procedures of a voice control process executed by the voice control program 601 in FIG. 6. The voice control process in FIG. 13 is achieved because the CPU 302 of the voice control apparatus 100 develops the voice control program 601 stored in the external storage unit 305 onto the RAM 303 and runs it.

As shown in FIG. 13, the voice control program 601 obtain the voice that the user utters to the microphone 308 with the voice obtainment module 604 (step S1301). The voice control program 601 determines an end of the obtained voice with the utterance end determination module 608, converts the voice from an utterance start to an utterance end into voice data, and stores the voice data concerned into the external storage unit 305. Next, the voice control program 601 determines whether the voice data is detected (step S1302). In the step S1302, when the process for storing the voice data into the external storage unit 305 is completed, the voice control program 601 determines that the voice data is detected, for example. In the meantime, when the utterance end determination module 608 does not determine the end of the obtained voice and the process for storing the voice data into the external storage unit 305 is not completed, the voice control program 601 determines that the voice data is not detected.

As a result of the determination in the step S1302, when the voice data is not detected, the voice control process returns to the step S1301. As a result of the determination in the step S1302, when the voice data is detected, the voice control program 601 blinks the LED 312 with the display module 606 (step S1303) to indicate that the voice control apparatus 100 is in the response processing state. Next, the voice control program 601 transmits the voice data stored in the external storage unit 305 to the server 102 with the data transmission/reception module 602 (step S1304). After that, the voice control program 601 waits until receiving the combined voice data from the server 102.

When the combined voice data is received from the server 102 (YES in the step S1305), the voice control program 601 reproduces the received combined voice data with the voice reproduction module 605 (step S1306). Next, the voice control program 601 determines whether an interactive-session-end notification is received from the server 102 (step S1307).

As a result of the determination in the step S1307, when the interactive-session-end notification is not received from the server 102, the voice control process returns to the step S1301. As a result of the determination in the step S1307, when the interactive-session-end notification is received from the server 102, the voice control program 601 turns off the LED 312 with the display module 606 (step S1308) to indicate that the voice control apparatus 100 is in the standby state. Next, the voice control program 601 closes an interactive session (step S1309) and the voice control process is finished. After finishing the voice control process, when the user utters to the microphone 308, the process of the step S1301 will be executed.

Figure 14:
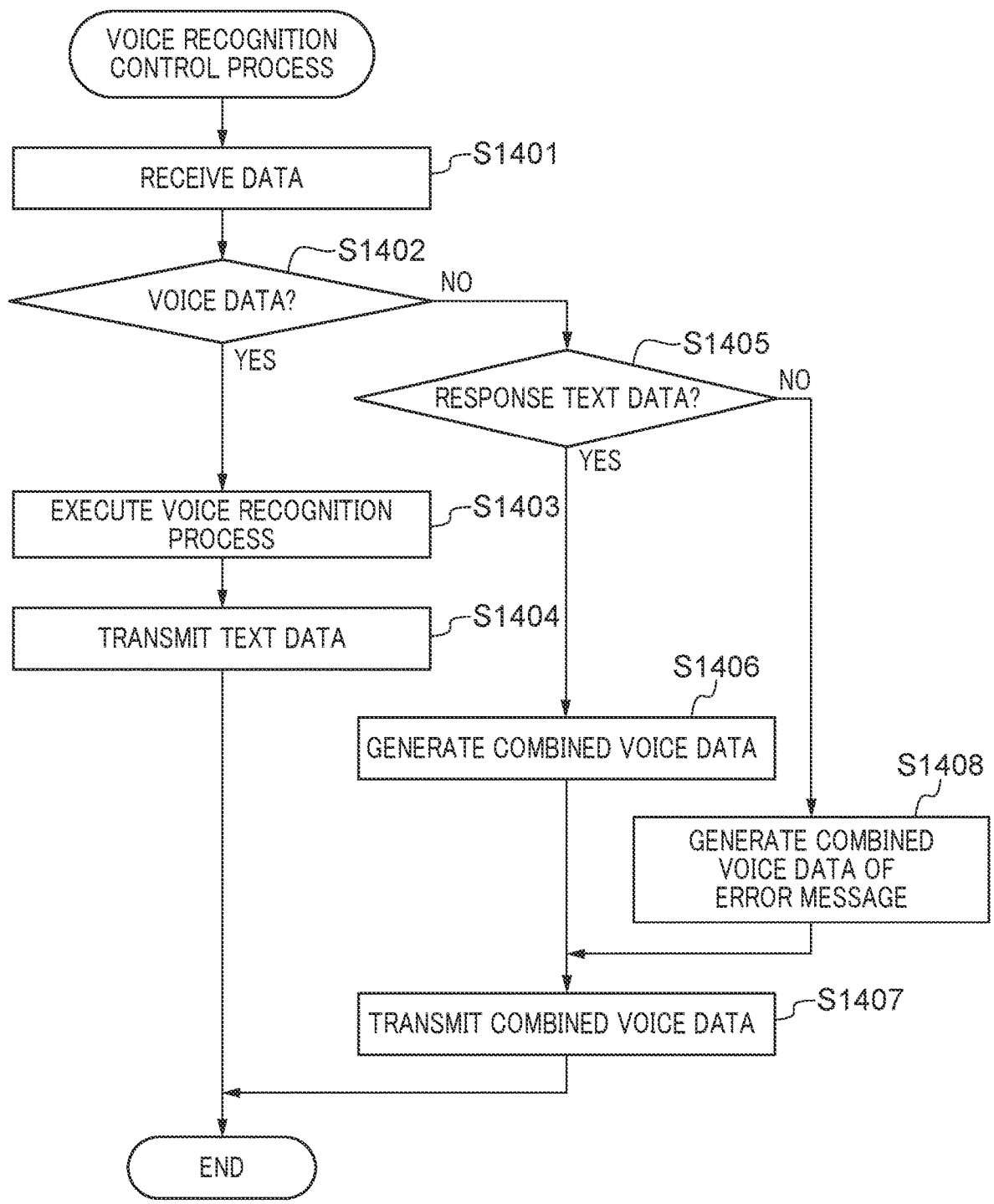
FIG. 14 is a flowchart showing procedures of a voice recognition control process executed by the voice recognition program in FIG. 7.

FIG. 14 is a flowchart showing procedures of a voice recognition control process executed by the voice recognition program 701 in FIG. 7. The voice recognition control process in FIG. 14 is achieved because the CPU 402a of the server 102 develops the voice recognition program 701 stored in the external storage unit 405a onto the RAM 403a and runs it.

As shown in FIG. 14, the voice recognition program 701 receives voice data or text data with the data transmission/reception module 702 (step S1401). The voice recognition program 701 stores the received data and the information about the transmitting source of the data concerned into the external storage unit 405a with the data management module 703. Next, the voice recognition program 701 determines whether the data stored in the external storage unit 405a is voice data (step S1402).

As a result of the determination in the step S1402, when the data stored in the external storage unit 405a is voice data, the voice recognition program 701 applies the voice recognition process to the received voice data with the voice recognition module 705 (step S1403). Moreover, the voice recognition program 701 stores the result of the voice recognition process into the external storage unit 405a with the data management module 703. Next, the voice recognition program 701 performs morphological analysis to the stored result of the voice recognition process with the morphological analysis module 706 to generate text data. The voice recognition program 701 transmits this text data to the remote control program 801 (step S1404), and the voice recognition control process is finished.

As a result of the determination in the step S1402, when the data stored in the external storage unit 405a is not voice data, the voice recognition program 701 determines whether the data stored in the external storage unit 405a is response text data (step S1405).

As a result of the determination in the step S1405, when the data stored in the external storage unit 405a is the response text data, the voice recognition program 701 applies the voice combination process to the data stored in the external storage unit 405a with the voice combination module 707 to generate combined voice data (step S1406). Next, the voice recognition program 701 transmits the generated combined voice data to the voice control apparatus 100 (step S1407), and the voice recognition control process is finished.

As a result of the determination in the step S1405, when the data stored in the external storage unit 405a is not response text data, the voice recognition program 701 determines that the data stored in the external storage unit 405a is invalid data. The voice recognition program 701 generates the combined voice data that reproduces the error message "voice cannot be recognized" (step S1408). After that, the voice recognition control process proceeds to the step S1407.

Figure 15:
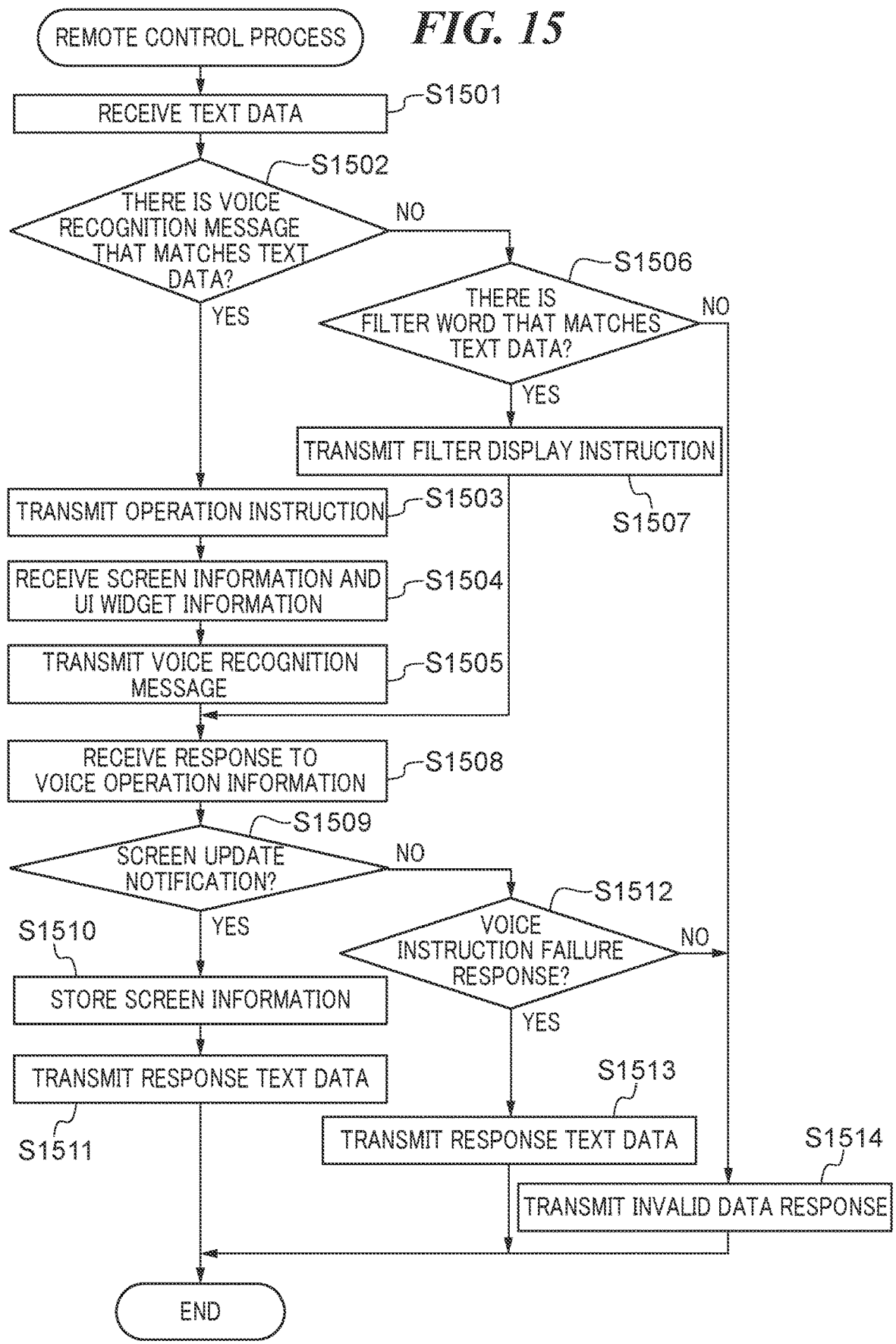
FIG. 15 is a flowchart showing procedures of a remote control process executed by the remote control program in FIG. 8A.

FIG. 15 is a flowchart showing procedures of a remote control process executed by the remote control program 801 in FIG. 8A. The remote control process in FIG. 15 is achieved because the CPU 402b of the server 102 develops the remote control program 801 stored in the external storage unit 405b onto the RAM 403b and runs it.

As shown in FIG. 15, the remote control program 801 receives text data from the voice recognition program 701 with the data transmission/reception module 802 (step S1501). The remote control program 801 stores this text data into the external storage unit 405b with the data management module 803. Specifically, the remote control program 801 compares the received text data with the voice recognition messages that the data management module 803 manages. The remote control program 801 determines whether the voice recognition messages that the data management module 803 manages include the voice recognition message that matches the received text data (step S1502).

As a result of the determination in the step S1502, when the voice recognition messages that the data management module 803 manages include the voice recognition message that matches the received text data, the remote control program 801 transmits the operation instruction corresponding to this voice recognition message to the image forming apparatus 101 with the data transmission/reception module 802 (step S1503). When receiving the operation instruction, the image forming apparatus 101 performs the process in the above-mentioned step S1203 to control the display of the touch panel in accordance with the received operation instruction. Moreover, the image forming apparatus 101 performs the process in the above-mentioned step S1204 to transmit the screen information that shows the type of the screen currently displayed on the touch panel 200 and the UI widget information that shows the UI widgets included in the screen concerned to the server 102.

The remote control program 801 receives the screen information and UI widget information from the image forming apparatus 101 with the data transmission/reception module 802 (step S1504). Next, the remote control program 801 specifies one or more voice recognition messages corresponding to the specified UI widget information from among the voice recognition messages that the data management module 803 manages. The remote control program 801 transmits all the specified voice recognition messages to the image forming apparatus 101 with the data transmission/reception module 802 (step S1505). Next, the remote control process proceeds to a step S1508 mentioned later.

As a result of the determination in the step S1502, when the voice recognition messages that the data management module 803 manages do not include the voice recognition message that matches the received text data, the remote control program 801 compares the received text data with the filter words that the data management module 803 manages. The remote control program 801 determines whether the filter words that the data management module 803 manages include the filter word that matches the received text data (step S1506).

As a result of the determination in the step S1506, when the filter word that matches the received text data is included in the filter words that the data management module 803 manages, the remote control program 801 transmits the filter display instruction to the image forming apparatus 101 (step S1507). As mentioned above, this filter display instruction includes the voice recognition message of which the filter word matches the received text data and the UI widget information corresponding to the voice recognition message concerned.

Next, when receiving the response to the voice operation information like the operation instruction or the filter display instruction from the image forming apparatus 101 (step S1508), the remote control program 801 determines whether the received response is the screen update notification (step S1509).

As a result of the determination in the step S1509, when the received response is the screen update notification, the remote control program 801 stores the screen information included in the received screen update notification into the external storage unit 405b with the data management module 803 (step S1510). Next, the remote control program 801 transmits the response text data to the voice recognition program 701 (step S1511), and the remote control process is finished.

As a result of the determination in the step S1509, when the received response is not the screen update notification, the remote control program 801 determines whether the received response is the voice operation failure response showing that the impracticable instruction is received (step S1512).

As a result of the determination in the step S1512, when the received response is the voice operation failure response, the remote control program 801 transmits a response text data including a message showing that the voice operation corresponding to the received voice operation instruction was failed to the voice recognition program 701 (step S1513). For example, the message "voice operation was impossible" is included. After that, the remote control process is finished.

When the received response is not the voice operation failure response as a result of the determination in the step S1512, or when the filter word that matches the received text data is not included in the filter words that the data management module 803 manages as a result of the determination in the step S1506, the remote control program 801 transmits an invalid data response to the voice recognition program 701 (step S1514). The response shows that the voice operation corresponding to the text data received in the step S1501 is invalid. After that, the remote control process is finished.

According to the above-mentioned embodiment, the text data is output on the basis of the voice data that is obtained by coding the voice obtained by the voice control apparatus 100, and the predetermined process linked to the UI widget is executed on the basis of the voice recognition message and text data. The voice recognition message includes a word related to the predetermined process linked to the UI widget at least. And the voice recognition message is displayed in association with the UI widget included in the screen that is currently displayed on the touch panel 200 of the image forming apparatus 101. That is, the voice recognition message that has the semantic relation with the process executed by the function corresponding to the UI widget is displayed in association with the UI widget. Thereby, the user can easily master a relation between an execution process and an utterance instruction.

Moreover, in the above-mentioned embodiment, when the text data does not match the voice recognition message, the filter display of the UI widgets relevant to the text data is performed and the voice recognition messages are displayed in association with the UI widgets concerned. This facilitates finding of a UI widget corresponding to a desired function by narrowing displayed UI widgets to UI widgets relevant to the text data on the basis of the voice recognition messages displayed in association with the UI widgets, while keeping the ease of mastery of a relation between an execution process and an utterance instruction.

In the above-mentioned embodiment, since a UI widget corresponding to each process is an icon, a mark, a button, an arrow, or a tab displayed on the touch panel 200, a user can easily master a relation between each process and an utterance instruction.

Moreover, in the above-mentioned embodiment, a voice recognition message is displayed in a balloon (see the balloon 1101, for example) displayed in association with a UI widget. Thereby, the user can easily understand a relation between a UI widget and a voice recognition message.

In the above-mentioned embodiment, the balloon 1102 showing that the voice operation is impossible is displayed in association with the secure print button 206 corresponding to the function that does not allow the voice operation among the UI widgets included in the screen currently displayed on the touch panel 200. Thereby, the user can easily understand that the voice operation of the secure print 206 is impossible.

In the above-mentioned embodiment, a predetermined process linked to a UI widget is a print process, a setting acceptance process about the print process, a scan process, or a setting acceptance process about the scan process. Thereby, the user can easily perform voice operations of acceptance of setting and an execution instruction about the print process and scan process.

Although the present invention has been described using the above-mentioned embodiment, the present invention is not limited to the above-mentioned embodiment. For example, the data management module 803 may not manage the filter words. In such a case, UI widgets that are subjected to the filter display may be specified on the basis of related words (a synonym, similar word, Web retrieval result) of a voice recognition message.

Moreover, the voice recognition program 701 and remote control program 801 may be stored in the external storage unit 505 of the image forming apparatus 101. In such a case, the image forming apparatus 101 executes the voice recognition control process in FIG. 14 and the remote control process in FIG. 15. In such a configuration, the image forming apparatus 101 obtains the voice data that is obtained by coding the voice of the user 106 from the microphone provided in the voice control apparatus 100 or the image forming apparatus 101. In this way, a user can easily master a relation between an execution process and an utterance instruction in the configuration that the image forming apparatus 101 recognizes voice without using the server 102.

In the above-mentioned embodiment, the home screen of the image forming apparatus 101 is not restricted to the home screen 201, and another home screen is also controlled similarly.

Figure 16:
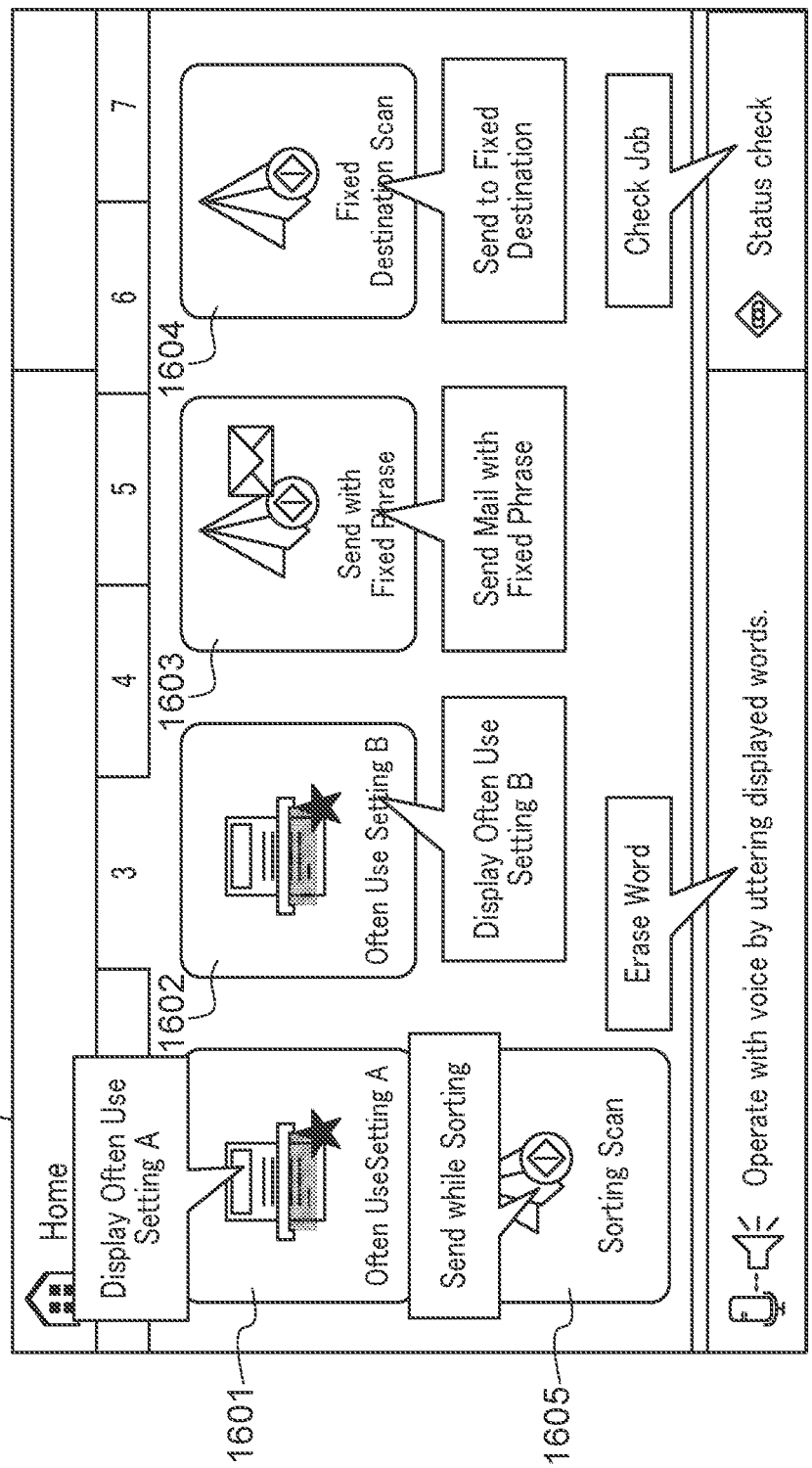
FIG. 16 is a view showing an example of the home screen displayed on the touch panel in FIG. 2.

FIG. 16 is a view showing an example of the other home screen 201b displayed on the touch panel 200 in FIG. 2. The home screen 202b corresponds to the tab 3. The home screen 202b includes the UI widgets relevant to the scan function of the image forming apparatus 101. Specifically, an often-use-setting-A button 1601, an often-use-setting-B button 1602, a send-with-fixed-phrase button 1603, a fixed destination scan button 1604, and a sorting scan button 1605 are included.

The often-use-setting-A button 1601 is a UI widget for designating execution of a process that scans a document on the basis of a scan setting registered beforehand to generate image data and sends the image data concerned.

The often-use-setting-B button 1602 is a UI widget for designating execution of a process that scans a document on the basis of a scan setting that is different from the scan setting for the often-use-setting-A button 1601 to generate image data and sends the image data concerned. The send-with-fixed-phrase button 1603 is a UI widget for designating execution of a process that scans a document to generate image data, attaches the image data to text information registered beforehand of a body of an E-mail, and sends the E-mail. The text information of the email body registered beforehand is a fixed phrase "We attach the data. Thank you for your assistance.", for example.

The fixed destination scan button 1604 is a UI widget for designating execution of a process that scans a document to generate image data and sends the image data concerned to a destination Z registered beforehand. The sorting scan button 1605 is a UI widget for designating execution of a process that scans a document to generate image data and saves the image data concerned as a file name of the scanned date and time etc.

When the user utters "start voice operation" to the microphone 308 of the voice control apparatus 100 in a state where the home screen 201b is displayed on the touch panel 200, voice recognition messages are displayed in association with the respective buttons of the home screen 201b as shown in FIG. 16.

Moreover, in the above-mentioned embodiment, the voice recognition messages and filter words may be set using a Web server function of the remote control program 801.

Figure 17:
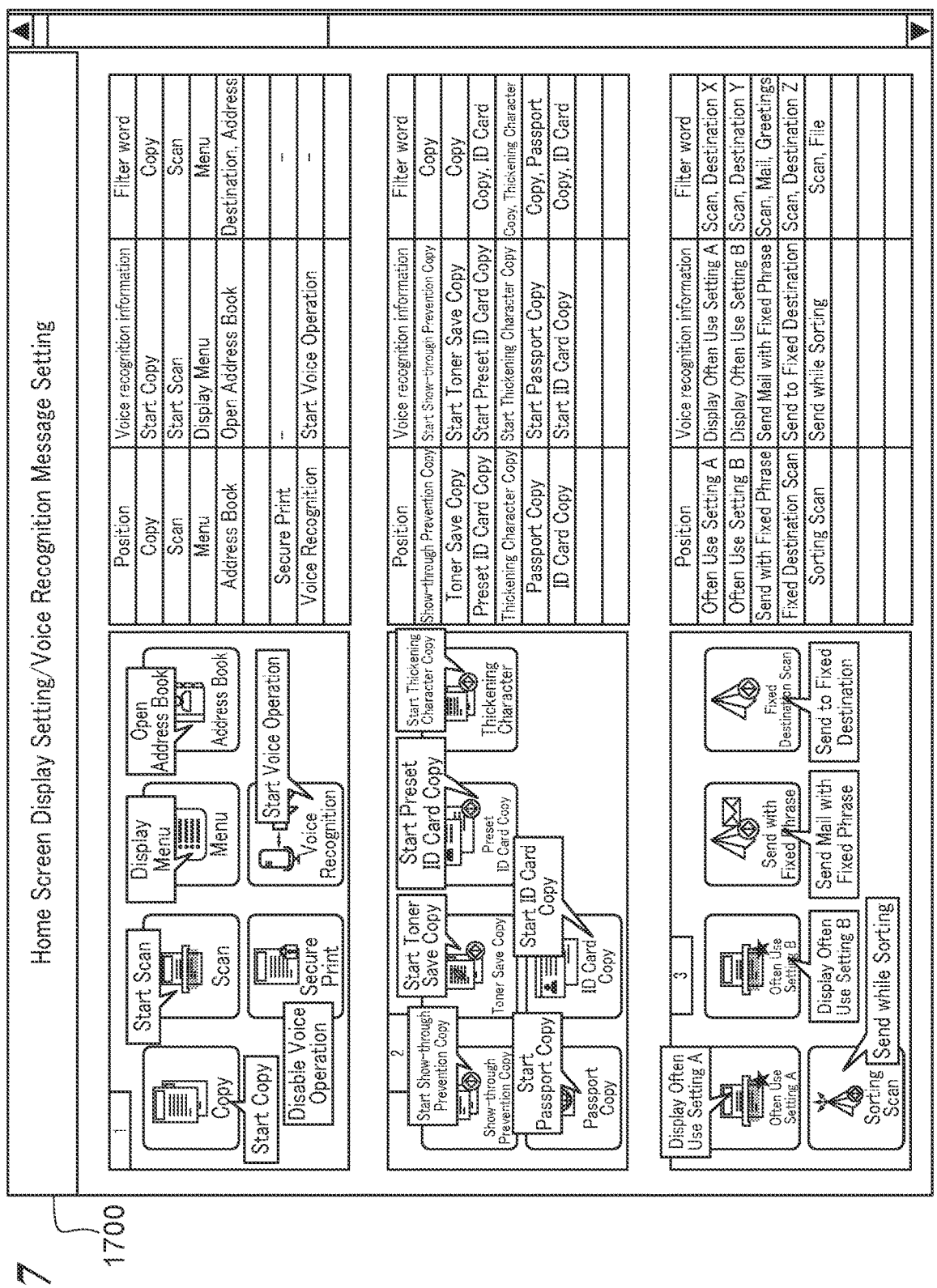
FIG. 17 is a view showing an example of a setting screen for setting up voice recognition messages and filter words in the embodiment.

FIG. 17 is a view showing an example of a setting screen 1700 for setting up voice recognition messages and filter words in the embodiment. As shown in FIG. 17, the home screen 201 corresponding to the tab 1, the home screen 201a corresponding to the tab 2, the home screen 201b corresponding to the tab 3, and text boxes corresponding to them are displayed. The setting screen 1700 is displayed by accessing the remote control program 801 of the server 102 by a Web browser. Names of the UI widgets (buttons) included in a corresponding home screen are set to a position column of a text box. The user can set a voice recognition message and a filter word in association with a name of each button. It should be noted that a symbol "-" is beforehand set in each of the voice recognition message field and the filter word field corresponding to the name of the UI widget like the secure print button 206 that does not allow the voice operation. A plurality of filter words can be set by inserting a delimiter "," between words. Moreover, the user can change the screen information and a UI widget message in the setting screen 1700.

Figure 18:
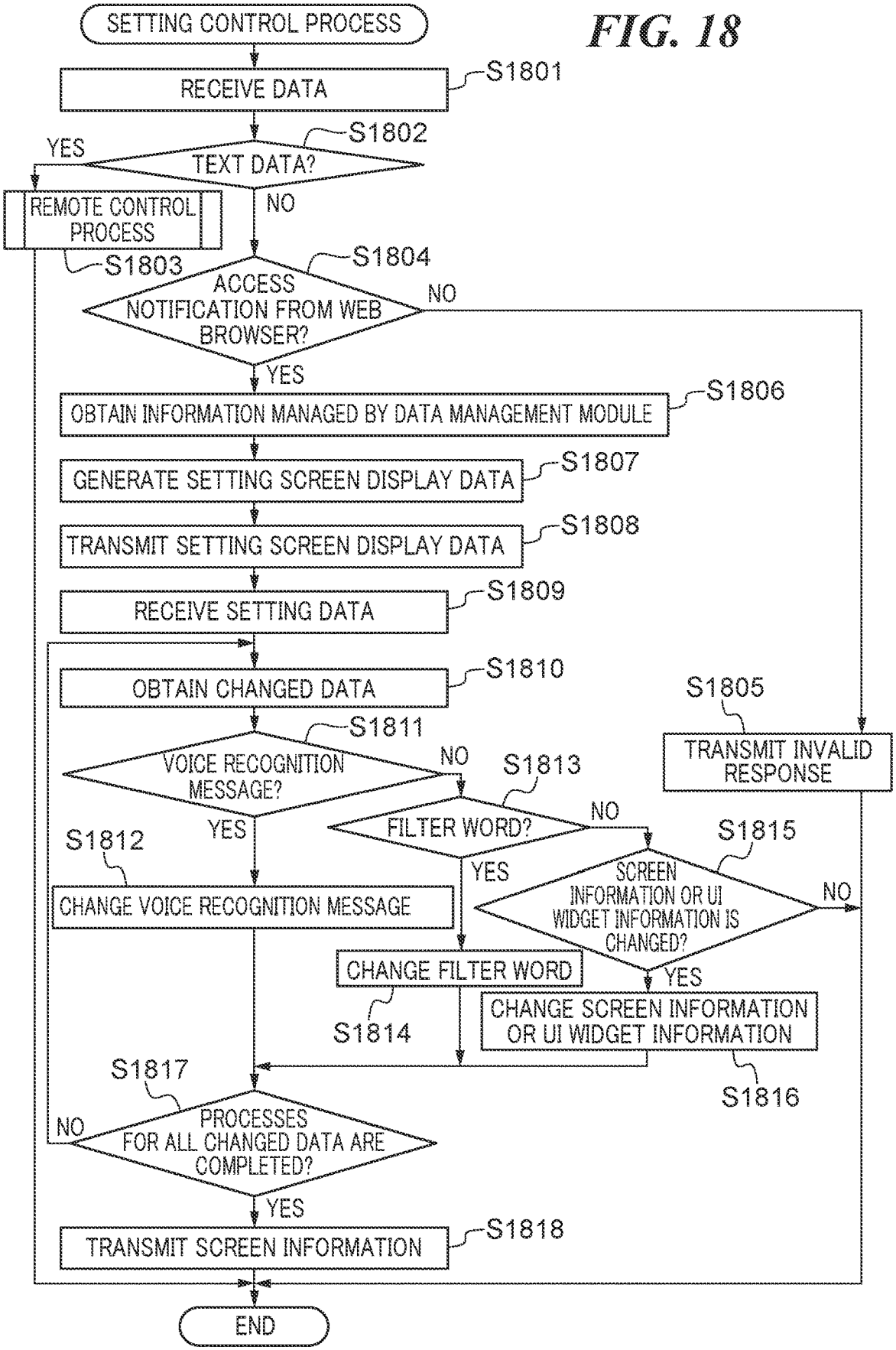
FIG. 18 is a flowchart showing procedures of a setting control process executed by the remote control program in FIG. 8A.

FIG. 18 is a flowchart showing procedures of a setting control process executed by the remote control program 801 in FIG. 8A. The setting control process in FIG. 18 is achieved because the CPU 402b of the server 102 develops the remote control program 801 stored in the external storage unit 405b onto the RAM 403b and runs it.

As shown in FIG. 18, the remote control program 801 receives data with the data transmission/reception module 802 (step S1801). Next, the remote control program 801 determines whether the received data is text data transmitted from the voice recognition program 701 (step S1802).

As a result of the determination in the step S1802, when the received data is the text data transmitted from the voice recognition program 701, the remote control program 801 executes the remote control process in FIG. 15 (step S1803) and the setting control process is finished.

As a result of the determination in the step S1802, when the received data is not the text data transmitted from the voice recognition program 701, the remote control program 801 determines whether the received data is the access notification transmitted from the Web browser of the client terminal 103 etc. (step S1804).

As a result of the determination in the step S1804, when the received data is not the access notification transmitted from the Web browser of the client terminal 103 etc., the remote control program 801 transmits the invalid response showing that the process is impossible to the transmitting source of the received data (step S1805). After that, the setting control process is finished.

As a result of the determination in the step S1804, when the received data is the access notification transmitted from the Web browser of the client terminal 103 etc., the remote control program 801 obtains the information that the data management module 803 manages (step S1806). Specifically, the remote control program 801 obtains the screen information, UI widget information, voice recognition messages, and filter words that the data management module 803 manages. Next, the remote control program 801 generates setting screen display data for displaying the setting screen 1700 on the Web browser of the client terminal 103 on the basis of the information obtained in the step S1806 (step S1807). Next, the remote control program 801 transmits the generated setting screen display data to the client terminal 103 (step S1808). The client terminal 103 displays the setting screen 1700 on the Web browser of the client terminal 103 on the basis of the received setting screen display data. The client terminal 103 transmits the setting data that the user set up in the setting screen 1700 to the server 102. The setting data includes a voice recognition message and a filter word that are changed by the user so that the corresponding screen information and UI widget information can be distinguished. Moreover, the setting data includes screen information about a new screen set by the user and UI widget information corresponding to the screen information concerned.

Next, the remote control program 801 receives the setting data from the client terminal 103 (step S1809). Next, the remote control program 801 specifies changed data on the basis of the setting data and the information obtained in the step S1806 and obtains the specified changed data (step S1810). When plural changed data are specified, the remote control program 801 obtains one changed data from among the plural changed data in the step S1810. Next, the remote control program 801 determines whether the obtained changed data is a voice recognition message (step S1811).

As a result of the determination in the step S1811, when the obtained change data is a voice recognition message, the remote control program 801 specifies the voice recognition message of which the screen information and UI widget information match that of the change data from among the voice recognition messages that the data management module 803 manages. The remote control program 801 changes the specified voice recognition message to the changed data (step S1812). Next, the setting control process proceeds to a step S1817 mentioned later.

As a result of the determination in the step S1811, when the changed data is not a voice recognition message, the remote control program 801 determines whether the obtained changed data is a filter word (step S1813).

As a result of the determination in the step S1813, when the obtained change data is a filter word, the remote control program 801 specifies the filter word of which the screen information and UI widget information match that of the change data from among the filter words that the data management module 803 manages. The remote control program 801 changes the specified filter word to the changed data (step S1814). Next, the setting control process proceeds to the step S1817 mentioned later.

As a result of the determination in the step S1813, when the changed data is not a filter word, the remote control program 801 determines whether the obtained changed data is the screen information or UI widget information (step S1815).

As a result of the determination in the step S1815, when the changed data is not the screen information nor the UI widget information, the setting control process is finished. As a result of the determination in the step S1815, when the changed data is the screen information or the UI widget information, the remote control program 801 specifies the information corresponding to the changed data from among the plurality of pieces of screen information and UI widget information that the data management module 803 manages.

The remote control program 801 changes the specified information to the changed data (step S1816). Next, the remote control program 801 determines whether the processes for all the changed data are completed (step S1817).

As a result of the determination in the step S1817, when the process for any changed data is not completed, the setting control process returns to the step S1801. As a result of the determination in the step S1817, when the processes for all the changed data are not completed, the remote control program 801 transmits the changed information to the image forming apparatus 101 (step S1818). The image forming apparatus 101 changes the display of the home screen on the basis of the received information. After that, the setting control process is finished.

The user can easily customize the voice recognition message and filter word by performing the above-mentioned setting control process in FIG. 18.

Although the configuration where the data management module 803 of the remote control program 801 manages the voice recognition messages and filter words is described in the above-mentioned embodiment, the present invention is not restricted to this configuration. For example, the data management module 903 of the device control program 901 may manage the voice recognition messages and filter words. When the data management module 903 manages the voice recognition messages and filter words, the user can change the settings of the voice recognition messages and filter words on the touch panel 200 of the image forming apparatus 101.

Moreover, when the data management module 903 of the device control program 901 manages the voice recognition messages and filter words, the device control program 901 may execute the setting control process in FIG. 18 using the Web server function of the device control program 901.

A CPU is an acronym of a Central Processing Unit. A DNN is an acronym of a Deep Neural Network. A GMM is an acronym of a Gaussian Mixture Model. An HDD is an acronym of a Hard Disk Drive. An HMM is an acronym of a Hidden Markov Model. An ID is an abbreviation of an Identification. An IEEE is an acronym of an Institute of Electrical and Electronics Engineers. An IP is an acronym of an Internet Protocol. A LAN is an acronym of a Local Area Network. An LCD is an acronym of a Liquid Crystal Display. An LED is an acronym of a Light Emitting Diode. An MEMS is an acronym of Micro Electro Mechanical Systems. An MP3 is an abbreviation of MPEG Audio Layer-3. A PC is an acronym of a Personal Computer. A RAM is an acronym of a Random Access Memory. An RNN is an acronym of Recurrent Neural Networks. A ROM is an acronym of a Read Only Memory. An SD card is abbreviation of a Secure Digital Memory Card. An SSD is an acronym of a Solid State Drive. A TCP is an acronym of a Transmission Control Protocol. A UI is an acronym of a User Interface. A URL is an acronym of a Uniform Resource Locator.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-209345, filed Dec. 17, 2020, which is hereby incorporated by reference herein in its entirety.

What is claimed is:
1. An information processing system comprising:
a display device configured to display information;
a voice obtainment unit configured to obtain a voice with a microphone;
an output unit configured to output word information based on the obtained voice in natural language obtained with the voice obtainment unit;
a display control unit configured to cause the display device to display a first screen, on which a plurality of touch objects corresponding to a plurality of functions of the information processing system is arranged, in a case where the information processing system starts, and cause the display device to display a second screen, on which the plurality of touch objects and utterance examples displayed in association with the plurality of touch objects are arranged, in a case where the voice obtainment unit obtains a voice indicating predetermined word information; and
an execution unit configured to execute a predetermined process linked to a specified touch object based at least on words included in a corresponding utterance example and the predetermined word information,
wherein the display control unit is configured to cause the display device to display, in a case where the output word information does not match the utterance examples displayed on the second screen, a third screen including at least a particular touch object from the plurality of touch objects displayed on the second screen and including the associated utterance example displayed on the second screen in association with the particular touch object, the third screen including at least an added touch object other than the plurality of touch objects, and the third screen including an added utterance example in association with the added touch object, the added utterance example other than the utterance examples displayed on the second screen, and the particular touch object and the added touch object relevant to the output word information.

2. The information processing system according to claim 1, wherein each touch object of the plurality of touch objects and the added touch object is at least one of an icon, a mark, a button, an arrow, and a tab.

3. The information processing system according to claim 1, wherein the display control unit is configured to cause the display device to display the utterance examples displayed on the second screen and the third screen in balloons displayed in association with the respective touch objects.

4. The information processing system according to claim 1, wherein the display control unit is configured to display information showing that a voice operation is impossible in association with a touch object corresponding to a function that does not allow the voice operation among the touch objects included in the second screen currently displayed by the display device.

5. The information processing system according to claim 1, wherein the display control unit is configured to hide a particular utterance example associated with a displayed in association with the touch object in a case where word information that instructs non-display of the particular utterance example is output.

6. The information processing system according to claim 1, wherein each of at least one utterance example of the utterance examples displayed on the second screen and the third screen includes words relevant to at least the predetermined process.

7. The information processing system according to claim 1, wherein the display control unit is configured to change the second screen currently displayed by the display device according to execution of the predetermined process.

8. The information processing system according to claim 1, further comprising a voice output control unit configured to output a voice message from a voice output device according to execution of the predetermined process.

9. The information processing system according to claim 1, further comprising a printing device configured to form an image on a sheet, wherein the predetermined process is a print process.

10. The information processing system according to claim 1, further comprising a printing device configured to form an image on a sheet, wherein the predetermined process is a setting acceptance process about a print process.

11. The information processing system according to claim 1, further comprising a scanning device configured to scan a document, wherein the predetermined process is a scan process.

12. The information processing system according to claim 1, further comprising a scanning device configured to scan a document, wherein the predetermined process is a setting acceptance process about a scan process.

13. The information processing system according to claim 1, further comprising:
an image processing apparatus that is provided with the display device, the display control unit, and the execution unit;
a voice control apparatus that is provided with the voice obtainment unit; and
an information processing apparatus that is provided with the output unit,
wherein the voice control apparatus includes a transmission unit configured to transmit the obtained voice in natural language obtained with the voice obtainment unit to the information processing apparatus, and
wherein the image processing apparatus includes an obtainment unit configured to obtain the output word information from the information processing apparatus.

14. The information processing system according to claim 1, further comprising:
an image processing apparatus that is provided with the voice obtainment unit, the display control unit, and the execution unit; and
an information processing apparatus that is provided with the output unit,
wherein the image processing apparatus comprises:
a transmission unit configured to transmit the obtained voice in natural language obtained with the voice obtainment unit to the information processing apparatus, and
an obtainment unit configured to obtain the output word information from the information processing apparatus.

15. The information processing system according to claim 1, further comprising: an image processing apparatus that is provided with the output unit, the display control unit, and the execution unit; and a voice control apparatus that is provided with the voice obtainment unit, wherein the voice control apparatus includes a transmission unit configured to transmit the obtained voice in natural language obtained with the voice obtainment unit to the image processing apparatus.

16. The information processing system according to claim 1, wherein the predetermined word information is voice word information predetermined to start a voice operation of the information processing system when the second screen is displayed by the display device.

17. The information processing system according to claim 8, wherein, in the case where the voice obtainment unit obtains the voice indicating the predetermined word information, the voice output device is configured not to output a voice message based on the obtained voice indicating the predetermined word information and the display control unit is configured to additionally display the utterance examples in association with the touch objects included in the second screen.

18. The information processing system according to claim 9, wherein the utterance examples on the second screen include an utterance example indicating a copy function.

19. The information processing system according to claim 18,
wherein, in a case where the output word information is relevant to the copy function while the display device displays the second screen, the display control unit is configured to cause the display device to change display to the third screen on which utterance examples relevant to the copy function are arranged.

20. The information processing system according to claim 19, wherein the display control unit is configured to cause the display device to display the second screen, on which the utterance examples include an utterance example indicating a function other than the copy function, and the display control unit is configured to cause the display device to display the third screen, on which no utterance example indicating a function other than the copy function is arranged.

21. The information processing system according to claim 19, wherein, in a case where the voice obtainment unit obtains a voice instructing start of copying while the display device displays the third screen, the execution unit is configured to execute the print process.

22. The information processing system according to claim 9, wherein the utterance examples on the second screen include an utterance example indicating a function of checking a print job.

23. The information processing system according to claim 1, wherein at least one touch object from the plurality of touch objects displayed on the second screen is omitted on the third screen.

24. An image forming apparatus comprising:
a display device configured to display information;
a voice obtainment unit configured to obtain a voice with a microphone;
a printing device configured to form an image on a sheet;
a scanning device configured to scan a document;
an output unit configured to output word information based on the obtained voice in natural language obtained with the voice obtainment unit;
a display control unit configured to cause the display device to display a first screen, on which a plurality of touch objects corresponding to a plurality of functions of the image forming apparatus starts is arranged, in a case where the image forming apparatus starts, and cause the display device to display a second screen, on which the plurality of touch objects and utterance examples displayed in association with the plurality of touch objects are arranged, in a case where the voice obtainment unit obtains a voice indicating predetermined word information; and
an execution unit configured to execute a predetermined process linked to a specified touch object based at least on words included in a corresponding utterance example and the predetermined word information,
wherein the display control unit is configured to cause the display device to display, in a case where the output word information does not match the utterance examples displayed on the second screen, a third screen including at least a particular touch object from the plurality of touch objects displayed on the second screen and including the associated utterance example displayed on the second screen in association with the particular touch object, the third screen including at least an added touch object other than the plurality of touch objects, and the third screen including an added utterance example in association with the added touch object, the added utterance example other than the utterance examples displayed on the second screen, and the particular touch object and the added touch object relevant to the output word information.

25. A control method for an information processing system equipped with a display device configured to display information and a voice obtainment unit configured to obtain a voice with a microphone, the control method comprising:
outputting word information based on the obtained voice in natural language obtained with the voice obtainment unit;
causing the display device to display a first screen, on which a plurality of touch objects corresponding to a plurality of functions of the information processing system is arranged, in a case where the information processing system starts;
causing the display device to display a second screen, on which the plurality of touch objects and utterance examples displayed in association with the plurality of touch objects are arranged, in a case where the voice obtainment unit obtains a voice indicating predetermined word information; and
executing a predetermined process linked to a specified touch object based at least on words included in a corresponding utterance example and the predetermined word information,
wherein the control method further comprises causing the display device to display, in a case where the output word information does not match the utterance examples displayed on the second screen, a third screen including at least a particular touch object from the plurality of touch objects displayed on the second screen and including the associated utterance example displayed on the second screen in association with the particular touch object, the third screen including at least an added touch object other than the plurality of touch objects, and the third screen including an added utterance example in association with the added touch object, the added utterance example other than the utterance examples displayed on the second screen, and the particular touch object and the added touch object relevant to the output word information.

26. A non-transitory computer-readable storage medium storing a control program causing a computer to execute a control method for an information processing system equipped with a display device configured to display information and a voice obtainment unit configured to obtain a voice with a microphone, the control method comprising:
outputting word information based on the obtained voice in natural language obtained with the voice obtainment unit;
causing the display device to display a first screen, on which a plurality of touch objects corresponding to a plurality of functions of the information processing system is arranged, in a case where the information processing system starts;
causing the display device to display a second screen, on which the plurality of touch objects and utterance examples displayed in association with the plurality of touch objects are arranged, in a case where the voice obtainment unit obtains a voice indicating predetermined word information; and
executing a predetermined process linked to a specified touch object based at least on words included in a corresponding utterance example and the predetermined word information,
wherein the control method further comprises causing the display device to display, in a case where the output word information does not match the utterance examples displayed on the second screen, a third screen including at least a particular touch object from the plurality of touch objects displayed on the second screen and including the associated utterance example displayed on the second screen in association with the particular touch object, the third screen including at least an added touch object other than the plurality of touch objects, and the third screen including an added utterance example in association with the added touch object, the added utterance example other than the utterance examples displayed on the second screen, and the particular touch object and the added touch object relevant to the output word information.

27. An information processing system comprising:
a display device configured to display information;
a voice obtainment unit configured to obtain a voice with a microphone;
an output unit configured to output word information based on the obtained voice in natural language obtained with the voice obtainment unit;

a display control unit configured to cause the display device to display a first screen, on which at least one touch object corresponding to at least one function of the information processing system is arranged, in a case where the information processing system starts, and cause the display device to display a second screen, on which the at least one touch object and at least one utterance example displayed in association with the at least one touch object are arranged, in a case where the voice obtainment unit obtains a voice indicating predetermined word information; and an execution unit configured to execute a predetermined process linked to a specified touch object based at least on words included in a corresponding utterance example and the predetermined word information, wherein the display control unit is configured to cause the display device to display, in a case where the output word information does not match the at least one utterance example displayed on the second screen, a third screen including at least a particular touch object from the at least one touch object displayed on the second screen and including the associated utterance example displayed on the second screen in association with the particular touch object, the third screen including at least an added touch object other than the at least one touch object, and the third screen including an added utterance example in association with the added touch object, the added utterance example other than the at least one utterance example displayed on the second screen, and the particular touch object and the added touch object relevant to the output word information.

\* \* \* \* \*